US011317259B2

(12) United States Patent
Baek et al.

(10) Patent No.: US 11,317,259 B2
(45) Date of Patent: Apr. 26, 2022

(54) V2X COMMUNICATION DEVICE AND COMMUNICATION METHOD THEREOF

(71) Applicant: LG Electronics Inc., Seoul (KR)

(72) Inventors: Jongseob Baek, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 16/765,973

(22) PCT Filed: Dec. 14, 2017

(86) PCT No.: PCT/KR2017/014754
§ 371 (c)(1),
(2) Date: May 21, 2020

(87) PCT Pub. No.: WO2019/117369
PCT Pub. Date: Jun. 20, 2019

(65) Prior Publication Data
US 2020/0367030 A1    Nov. 19, 2020

(51) Int. Cl.
*H04W 4/23* (2018.01)
*H04W 4/40* (2018.01)
*H04W 80/02* (2009.01)
*H04W 84/12* (2009.01)
*H04W 92/18* (2009.01)

(52) U.S. Cl.
CPC .............. *H04W 4/23* (2018.02); *H04W 4/40* (2018.02); *H04W 80/02* (2013.01); *H04W 84/12* (2013.01); *H04W 92/18* (2013.01)

(58) Field of Classification Search
CPC ....... H04W 4/23; H04W 48/16; H04W 80/02; H04W 4/40; H04W 84/12; H04W 92/18
See application file for complete search history.

(56) References Cited

U.S. PATENT DOCUMENTS

| 2015/0296411 A1 | 10/2015 | Meyer et al. |
| 2016/0037483 A1 | 2/2016 | Du et al. |
| 2016/0150451 A1 | 5/2016 | Barreto De Miranda Sargento et al. |
| 2018/0014247 A1* | 1/2018 | Chandramouli ...... H04W 76/15 |
| 2019/0273624 A1* | 9/2019 | Hoffmann ............... H04W 4/24 |

FOREIGN PATENT DOCUMENTS

| KR | 101567212 | 11/2015 |
| WO | 2017052488 | 3/2017 |

OTHER PUBLICATIONS

ETSI EN 302 665 V1.1.1, Intelligent Transport Systems (ITS); Communications Architecture. (2010-09). (Year: 2010).*

(Continued)

*Primary Examiner* — Oussama Roudani
(74) *Attorney, Agent, or Firm* — Dentons US LLP

(57) ABSTRACT

The present disclosure discloses a communication method of a hybrid V2X communication device. The method of comprises accessing a first channel; receiving a Service Advertisement Message (SAM) from the first channel, the SAM providing service information and information related with a service channel through which a service is provided; and accessing a service channel and receiving service data based on the SAM.

10 Claims, 20 Drawing Sheets

(56) References Cited

OTHER PUBLICATIONS

ETSI TS 102 890-1 V1.1.1, Intelligent Transport Systems (ITS); Facilities layer function; Part 1: Services Announcement (SA) specification. (2017-05). (Year: 2017).*

XP014270570: ISO 16460 ETSI Draft, ITSWG2; European Telecommunications Standards Institute (ETSI), Sophia-Antipolis: Architecture and Cross Layer, Intelligent transport systems—Communications access for land mobiles (CALM)—Communications protocol messages for global usage, Apr. 5, 2016 (54 Pages).

* cited by examiner

[FIG. 1]
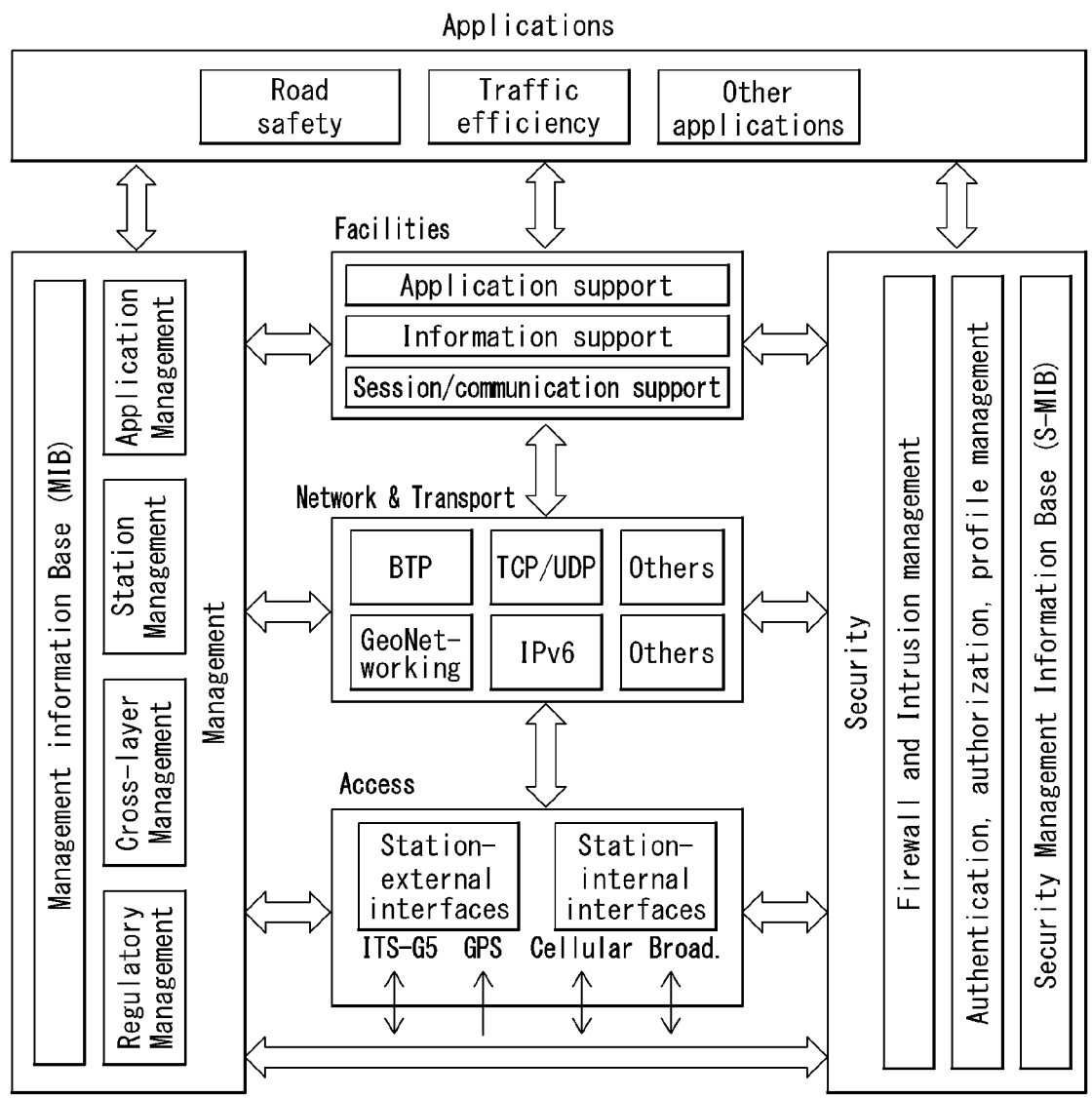

[FIG. 2]
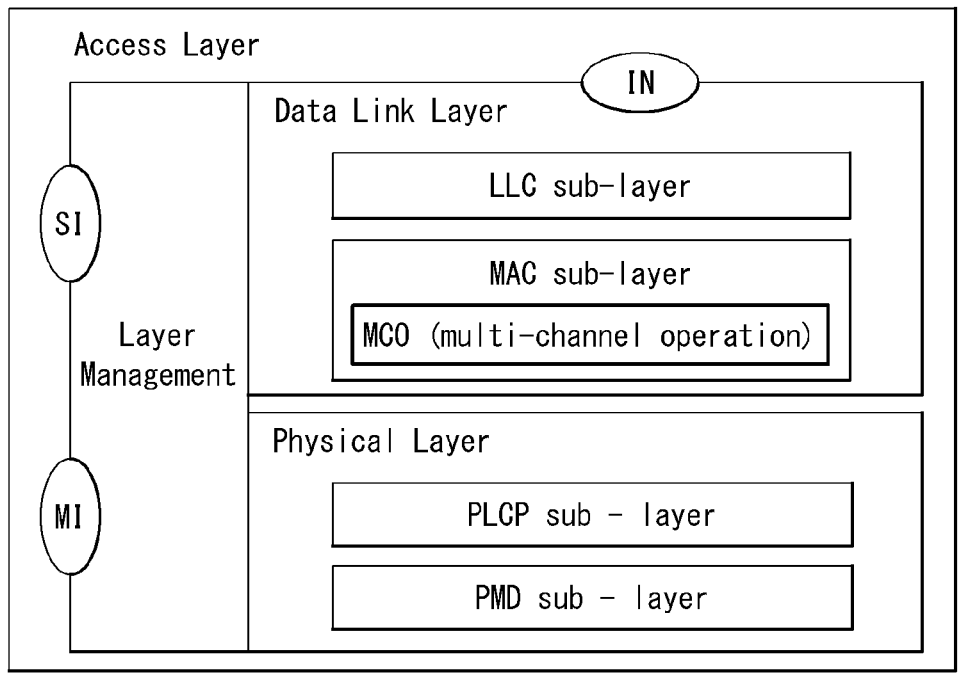
[FIG. 3]
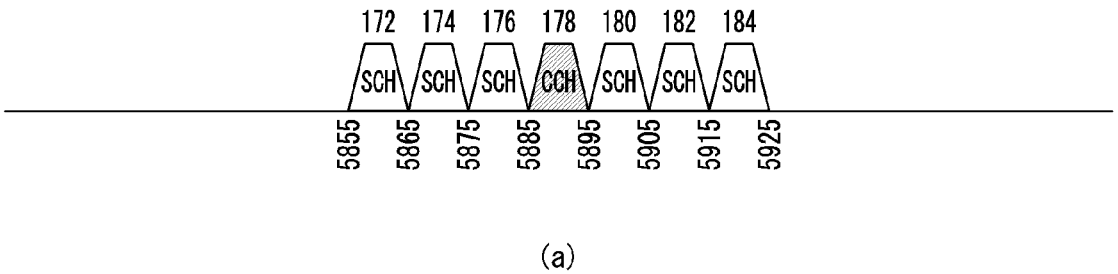
(a)
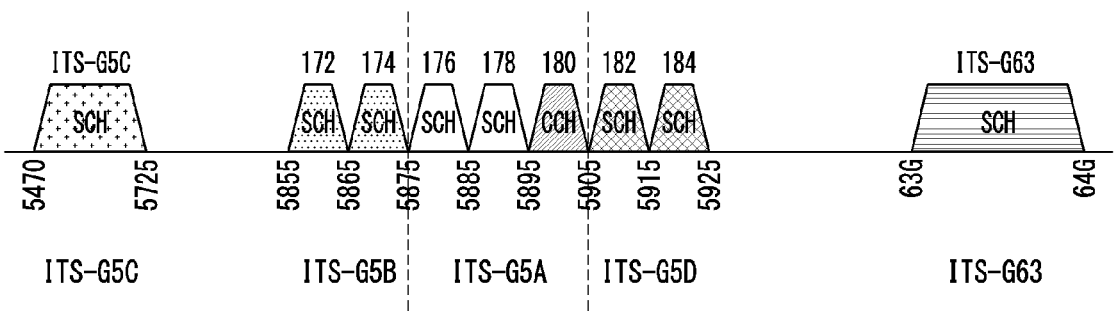
(b)

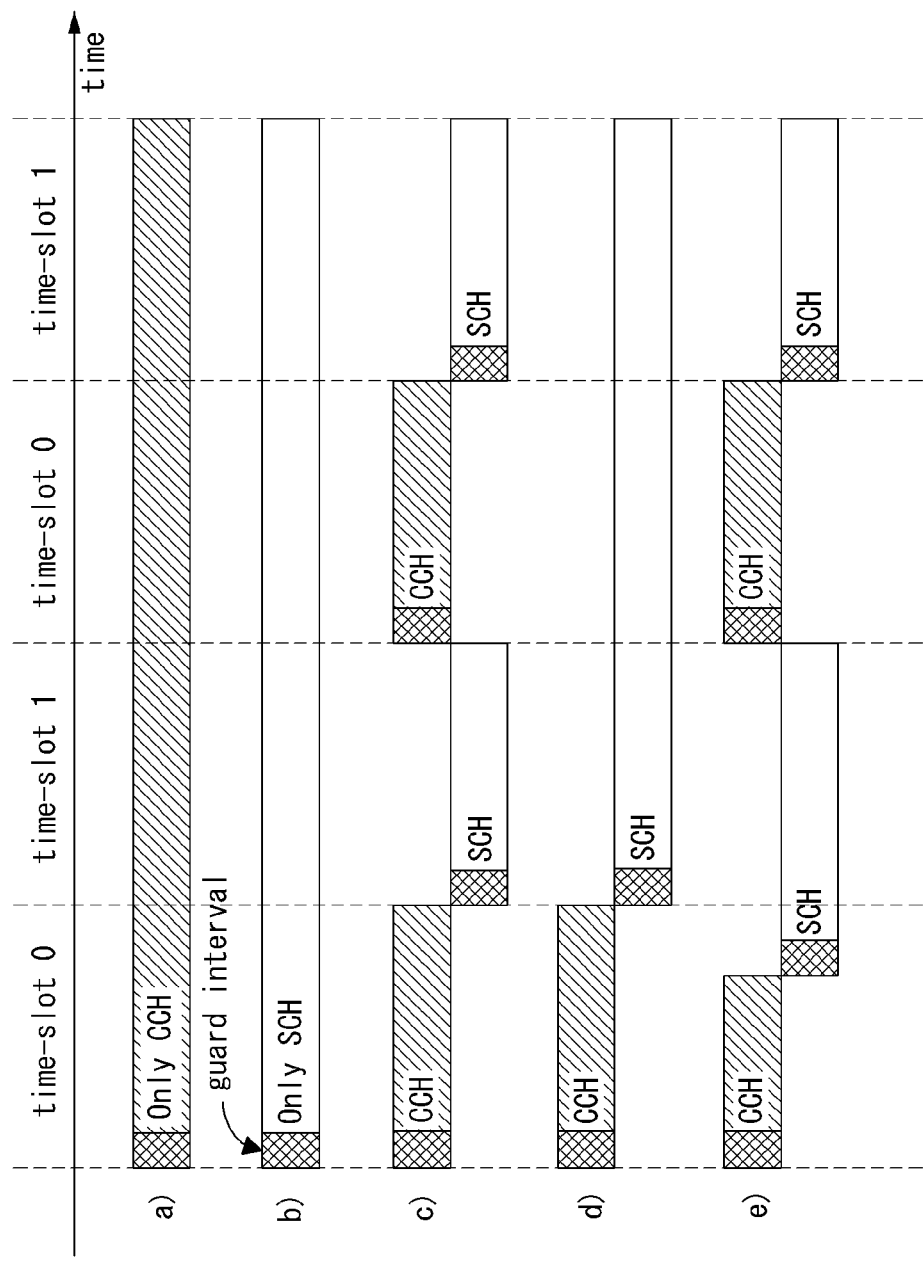
[FIG. 4]

| LM NPDU | | | | | | | | | |
|---|---|---|---|---|---|---|---|---|---|
| N-Header | | | | T-Header | | | | | Body |
| 4bits | 1bit | 3bits | Variables | Variable | 7bits | 1bit | Variables | Variable | 1..2 octets | Variable |
| | | | | | TPID | | | | | |
| | | | | | Feature selector | T-Extensions flag | | | | |
| Subtype | N-Extensions flag | Version | Depends on subtype | N-Extensions | | | Depends on TPID | T-Extensions | Length of User Data | User Data |

| SAM | | | | | | | |
|---|---|---|---|---|---|---|---|
| Header | | | Body | | | | |
| 4bits | 4bits | 4bits | 4bits | Optional Variable | Optional Variable | Optional Variable | Optional Variable |
| Version | Option selector | SAM-ID | SAM Count | SAM Extensions | Service Info Segment | Chanel Info Segment | IPv6 Routing Advertisement |

[FIG. 7]

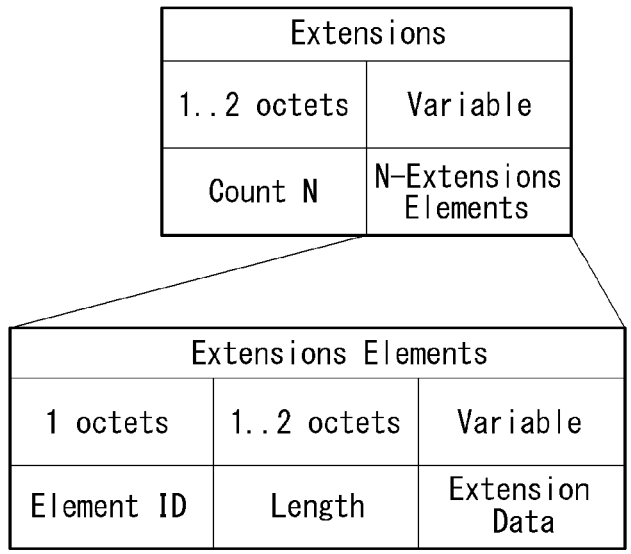

[FIG. 8]

| Name | ASN.1 type | Element ID value | Usage |
|---|---|---|---|
| | | 0-3 | Reserved for IEEE |
| Transmit Power Used | TXpower80211 | 4 | LM N-Extensions |
| 2D Location | TwoDLocation | 5 | SAM Header |
| 3D Location | ThreeDLocation | 6 | SAM Header |
| Advertiser Identifier | AdvertiserIdentifier | 7 | SAM Header |
| Provider Service Context | ProviderServiceContext | 8 | SAM Service Info |
| IPv6 Address | IPv6Address | 9 | SAM Service Info |
| Service Port | ServicePort | 10 | SAM Service Info |
| Provider MAC Address | ProviderMacAddress | 11 | SAM Service Info |
| EDCA Parameter Set | EdcaParameterSet | 12 | SAM Channel Info |
| Secondary DNS | SecondaryDns | 13 | SAM Routing Advertisement |
| Gateway MAC Address | GatewayMacAddress | 14 | SAM Routing Advertisement |
| Channel Number | ChannelNumber80211 | 15 | LM N-Extensions |
| Data Rate | DataRate80211 | 16 | LM N-Extensions |
| Repeat Rate | RepeatRate | 17 | SAM Header |
| | | 18 | Reserved for IEEE |
| RCPI Threshold | RcpiThreshold | 19 | SAM Service Info |
| WSA Count Threshold | WsaCountThreshold | 20 | SAM Service Info |
| Channel Access | ChannelAccess80211 | 21 | SAM Channel Info |
| WSA Count Threshold Interval | WsaCountThresholdInterval | 22 | SAM Service Info |
| Channel Load | not yet specified | 23 | LM N-Extensions |
| | | 24-79 | Reserved for IEEE |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |
| Packet ID | LMpacketID | 83 | LM T-Extensions |
| Extended Channel Infos | ExtendedChannelInfos | 84 | SAM Header |
| SAM Application Data | SAMapplicationData | 85 | SAM Service Info |
| | | 86-120 | Reserved for ISO |
| | | 121-255 | Reserved for IEEE |

[FIG. 9]

| Service Info Segment | | | | | |
|---|---|---|---|---|---|
| Variable | Variable | 5 bits | 3 bits | Optional Variable | Optional Variable | Optional Variable |
| Count N | ITS-AID | Channel Index | Option Selectors | System Service | Reply Port Number | Service Info Extensions |

[FIG. 10]

| Name | ASN.1 type | Element ID value | Usage |
|---|---|---|---|
| Provider Service Context | ProviderServiceContext | 8 | SAM Service Info |
| IPv6 Address | IPv6Address | 9 | SAM Service Info |
| Service Port | ServicePort | 10 | SAM Service Info |
| Provider MAC Address | ProviderMacAddress | 11 | SAM Service Info |
| RCPI Threshold | RcpiThreshold | 19 | SAM Service Info |
| WSA Count Threshold | WsaCountThreshold | 20 | SAM Service Info |
| WSA Count Threshold Interval | WsaCountThresholdInterval | 22 | SAM Service Info |
| SAM Application Data | SAMapplicationData | 85 | SAM Service Info |

[FIG. 11]

| Channel Info Segment | | | | | |
|---|---|---|---|---|---|
| Variable | 1 octet | 1 octet | 1 octet | 1 bit | 7 bits | 1 octet | Optional Variable |
| Count N | Operating Class | Channel Number | Transmit Power Level | Adaptable | Data Rate | Option Selector | Channel info Extensions |

Repeated N times

【FIG. 12】
| IPv6 Routing Advertisement | | | | | |
|---|---|---|---|---|---|
| 2 octets | 16 octets | 1 octet | 16 octets | 16 octets | Variable |
| Router Lifetime | IPv6 Prefix | IPv6 Prefix Length | Default Gateway | Primary DNS | IPv6 Routing Extensions |
【FIG. 13】
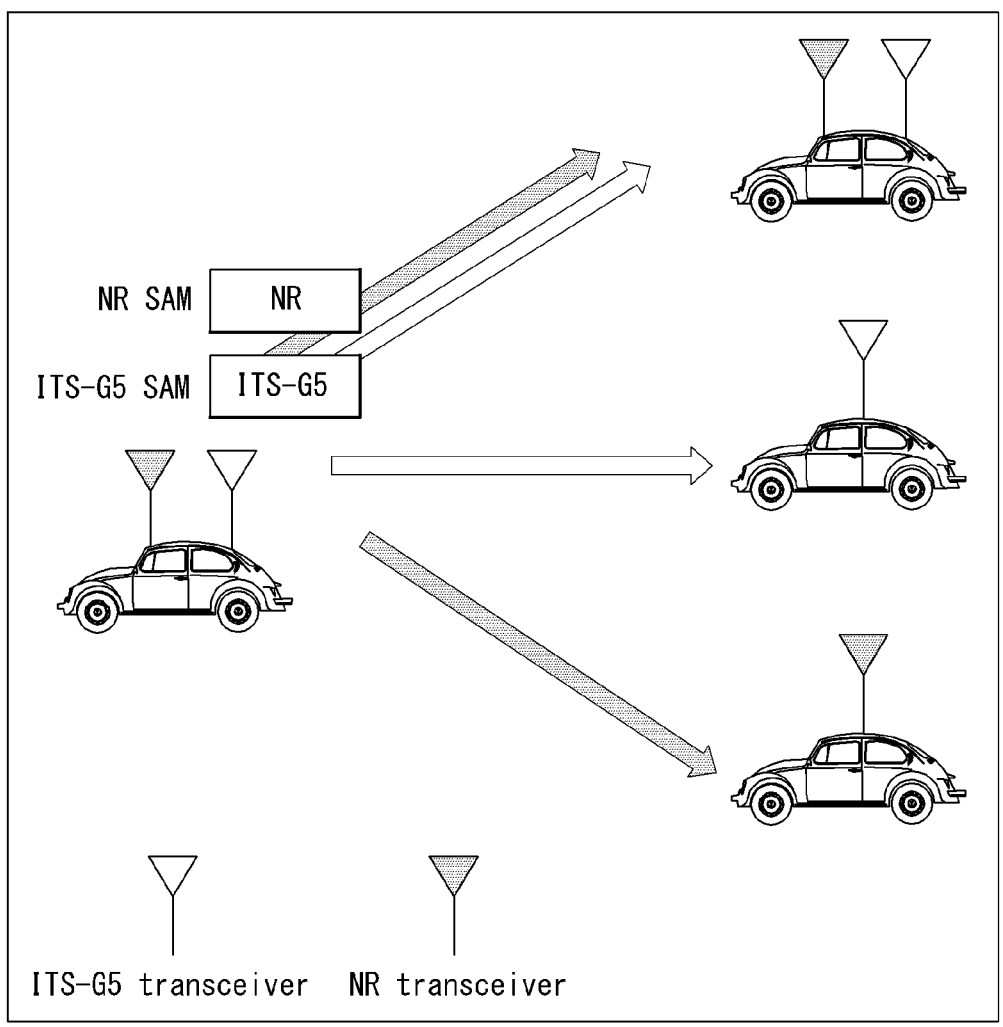

[FIG. 14]
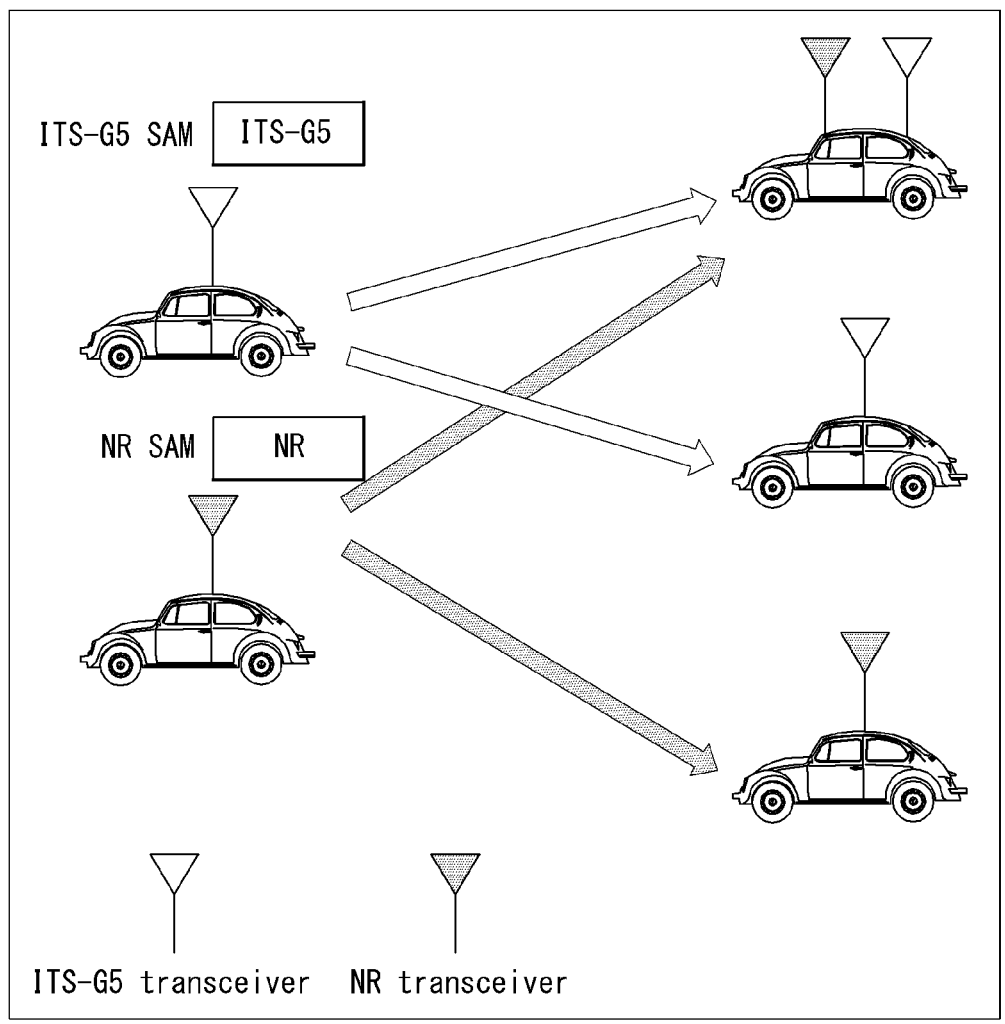

[FIG. 15]
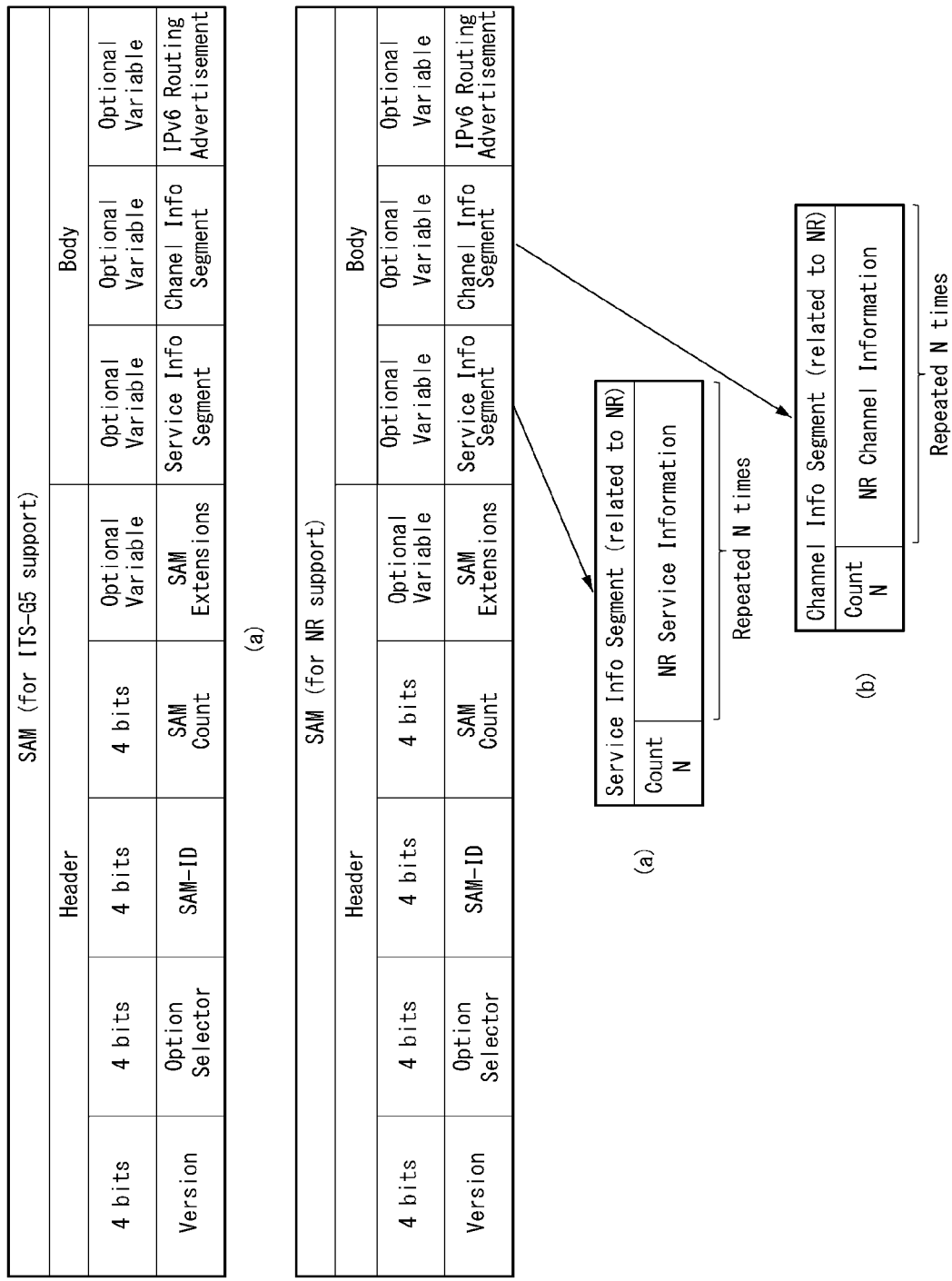

[FIG. 16]
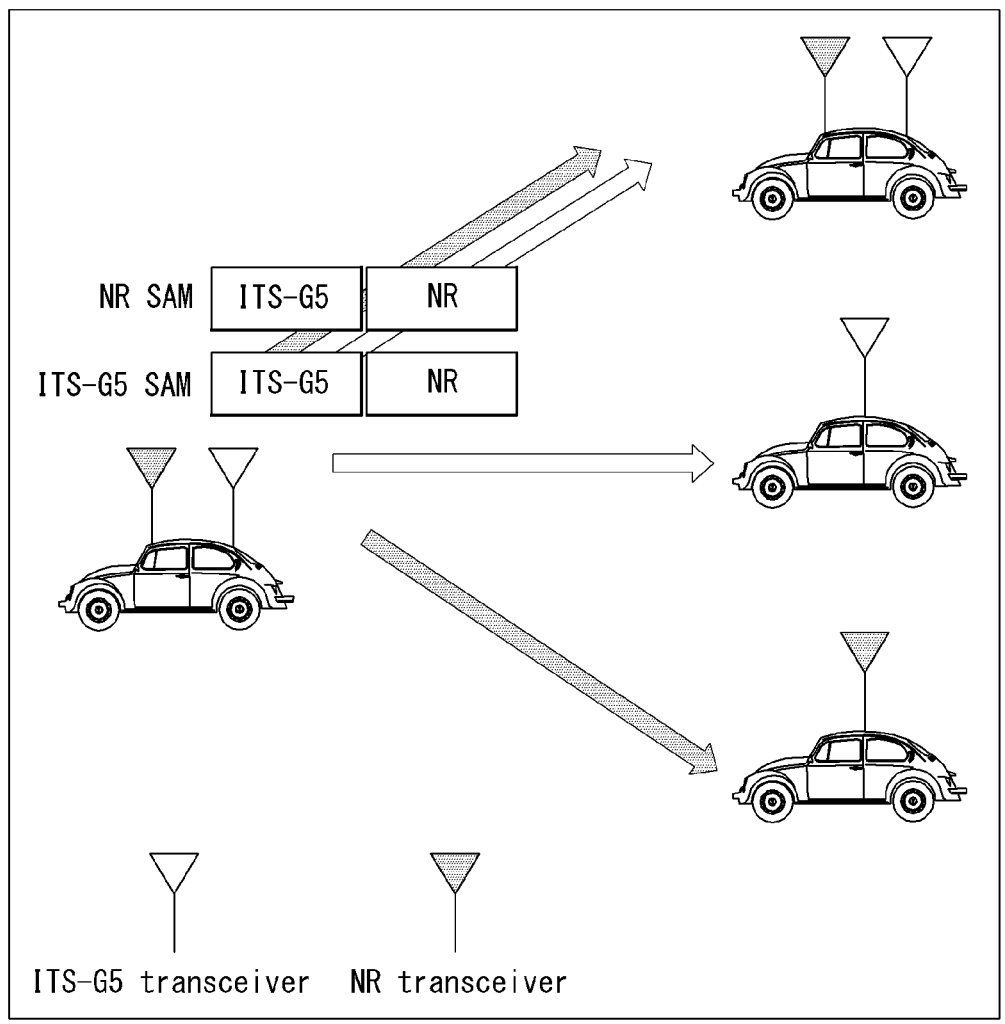

[FIG. 17]
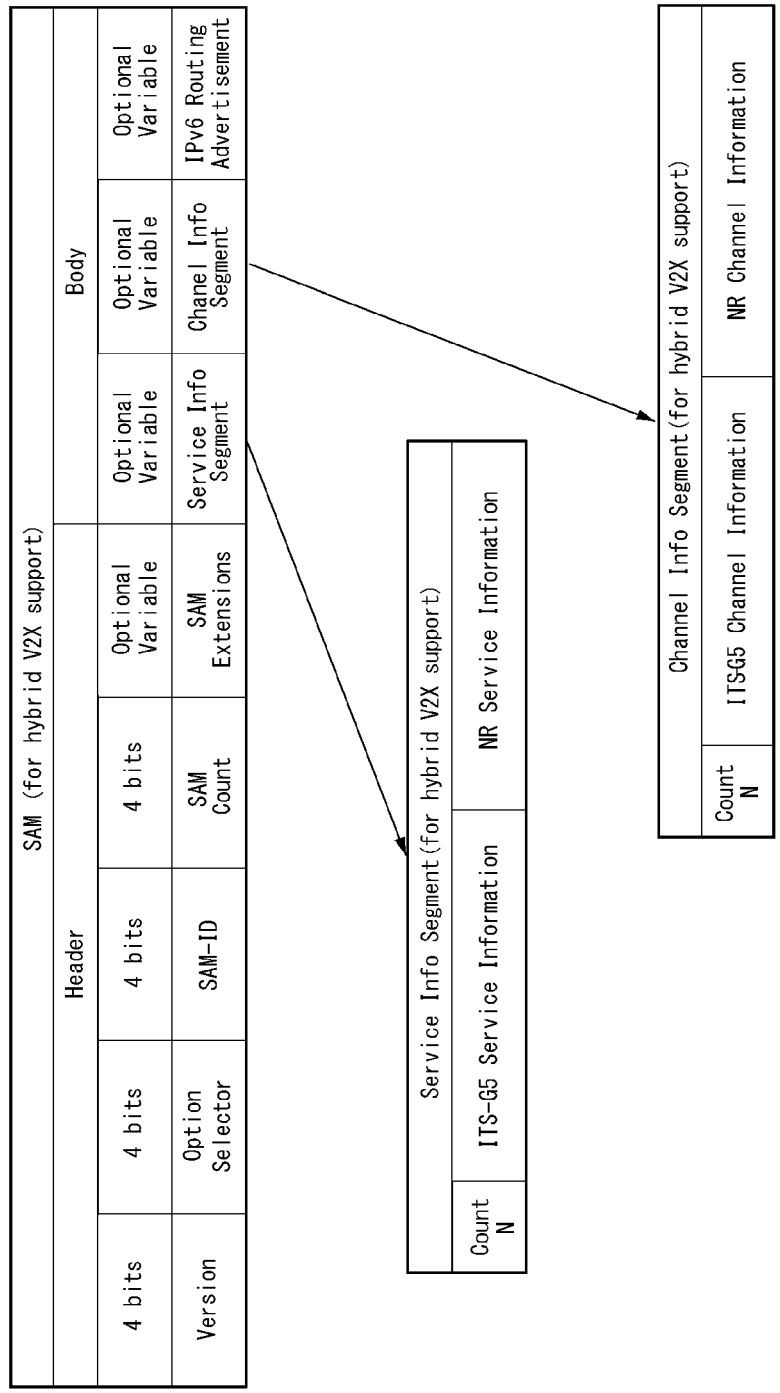

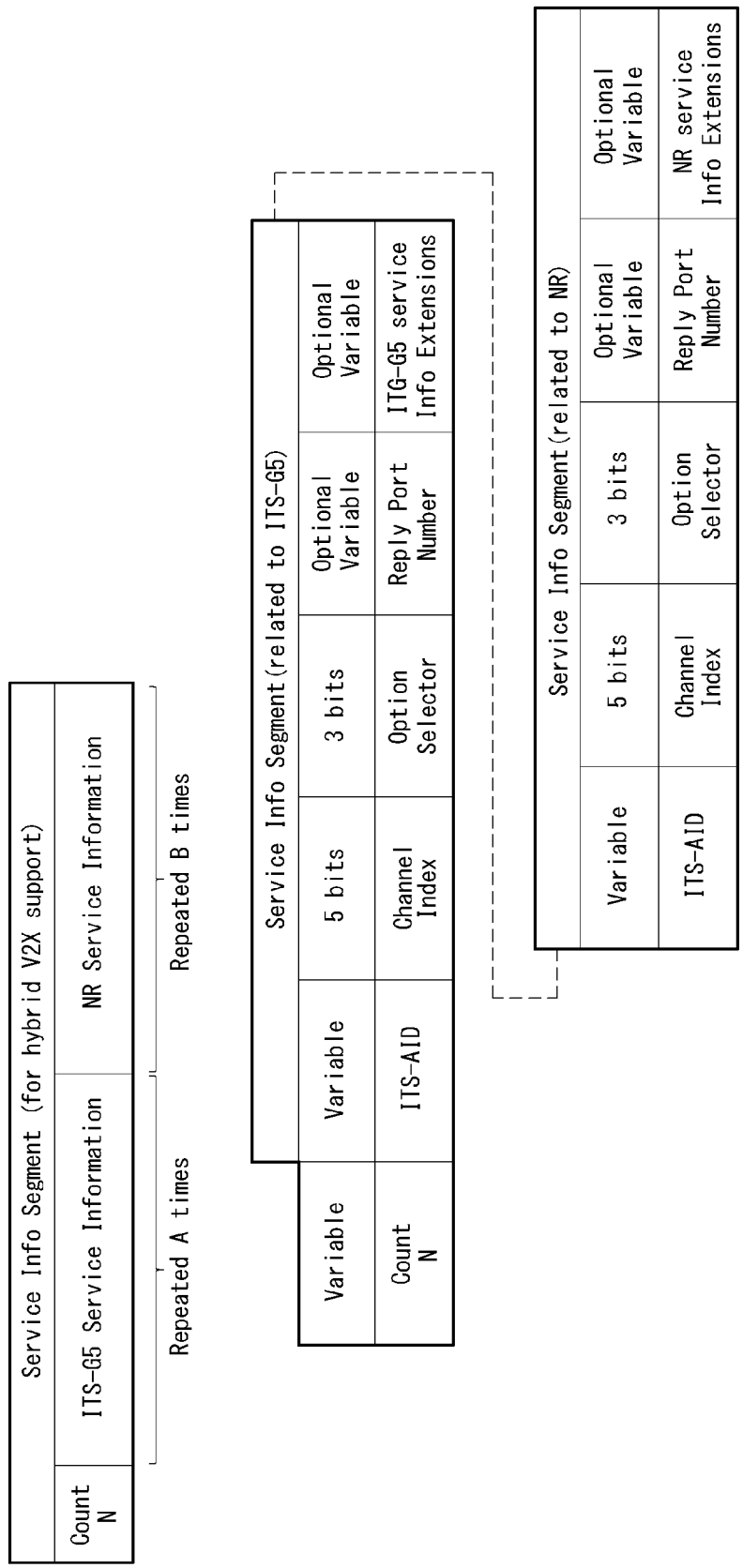
[FIG. 18]

[FIG. 19]
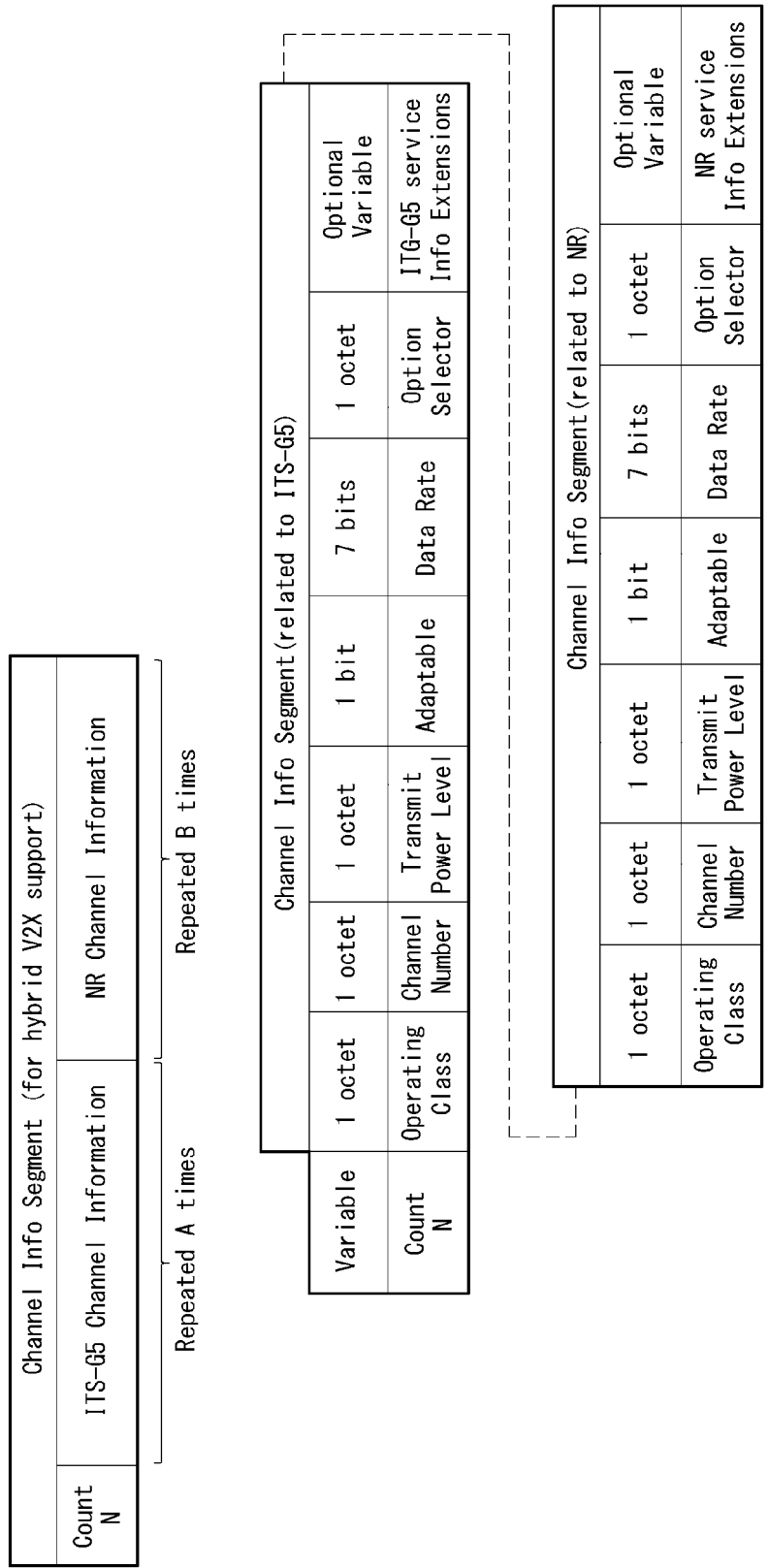

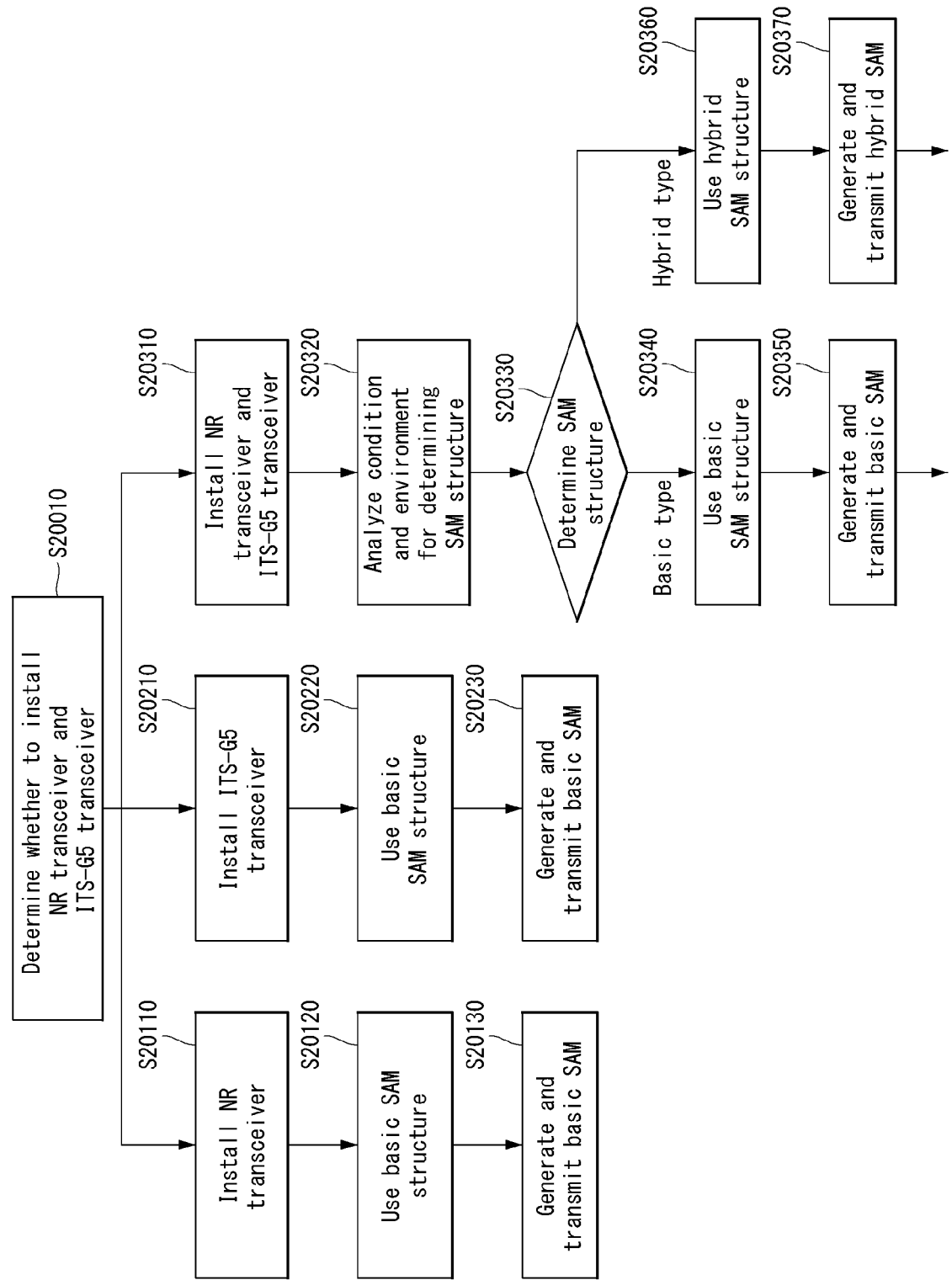
[FIG. 20]

[FIG. 21]
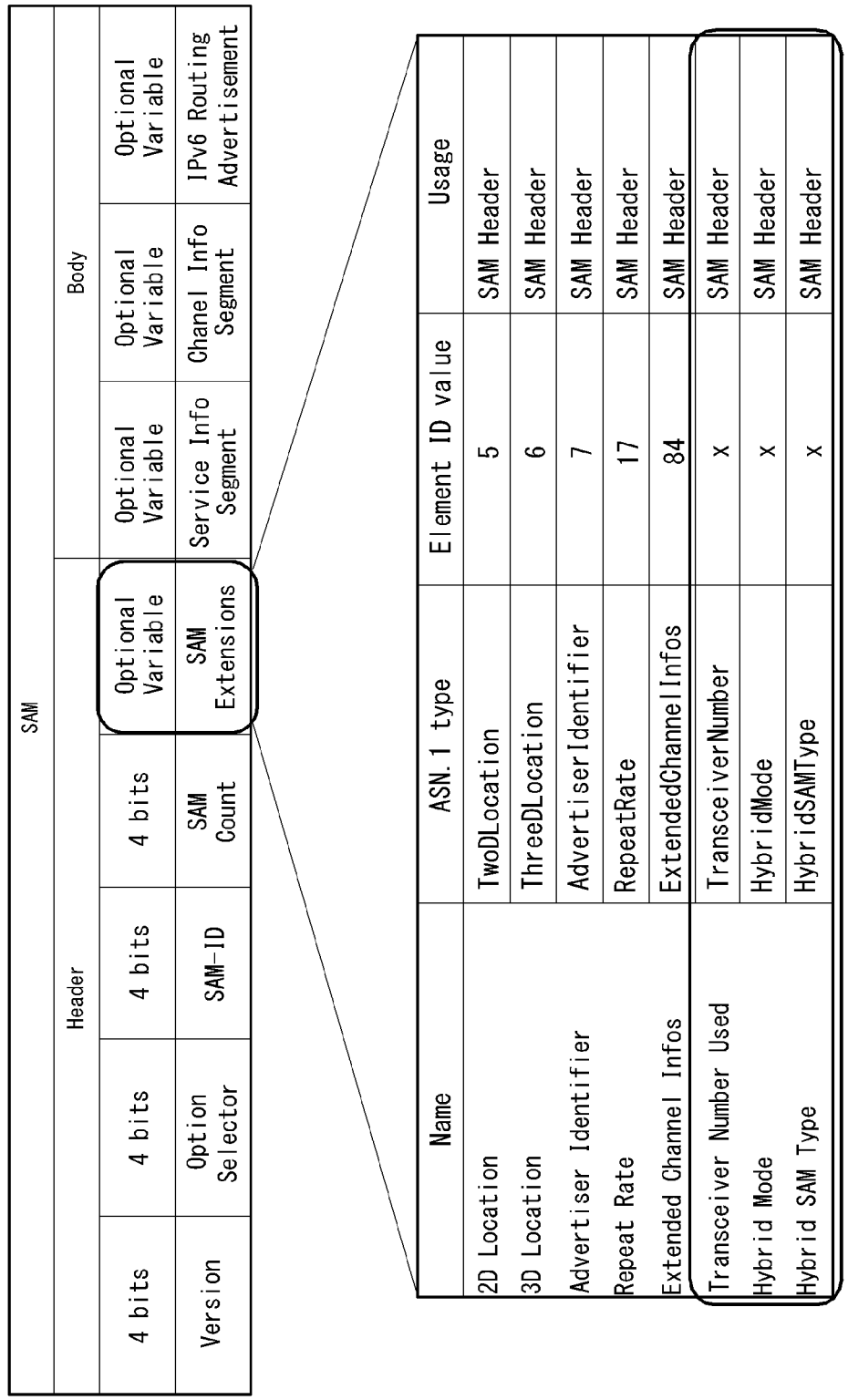

[FIG. 22]

| Name | ASN.1 type | Element ID value | Usage |
|---|---|---|---|
| Transmit Power Used | TxpowerNR | . | LM N-Extensions for NR |
| 2D Location | TwoDLocation | . | SAM Header for NR |
| 3D Location | ThreeDLocation | . | SAM Header for NR |
| Advertiser Identifier | AdvertiserIdentifier | . | SAM Header for NR |
| Provider Service Context | ProviderServiceContext | . | SAM Service Info for NR |
| IPv6 Address | IPv6Address | . | SAM Service Info for NR |
| Service Port | ServicePort | . | SAM Service Info for NR |
| Provider MAC Address | ProviderMacAddress | . | SAM Service Info for NR |
| Secondary DNS | SecondaryDns | . | SAM Routing Advertisement for NR |
| Gateway MAC Address | GatewayMacAddress | . | SAM Routing Advertisement for NR |
| Channel Number | ChannelNumberNR | . | LM N-Extensions for NR |
| Data Rate | DataRate80211 | . | LM N-Extensions for NR |
| Repeat Rate | RepeatRate | . | SAM Header for NR |
| RCPI Threshold | RcpiThreshold | . | SAM Service Info for NR |
| SAM Count Threshold | SAMCountThreshold | . | SAM Service Info for NR |
| Channel Load | not yet specified | . | LM N-Extensions for NR |
| LM TX CIP | TXcip | . | LM N-Extensions for NR |
| LM RX CIP | RXcip | . | LM N-Extensions for NR |
| Channel Busy Ratio | LMchannelBusyRatio | . | LM N-Extensions for NR |
| Packet ID | LMpacketID | . | LM T-Extensions for NR |
| Extended Channel Infos | ExtendedChannelInfos | . | SAM Header for NR |
| SAM Application Data | SAMapplicationData | . | SAM Service Info for NR |

[FIG. 23]
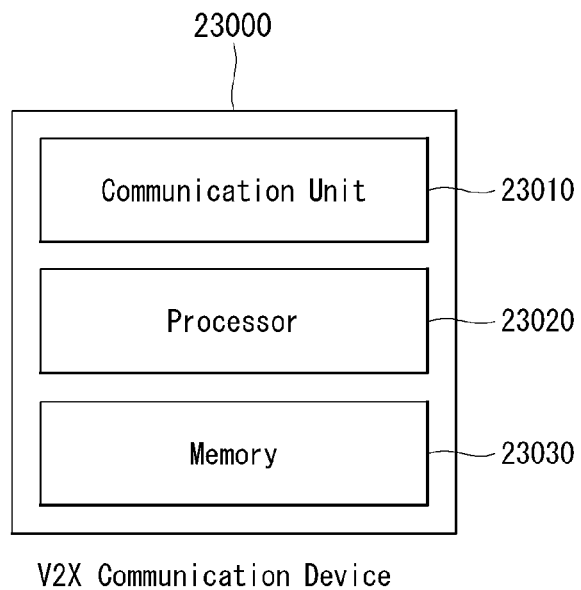
V2X Communication Device
[FIG. 24]
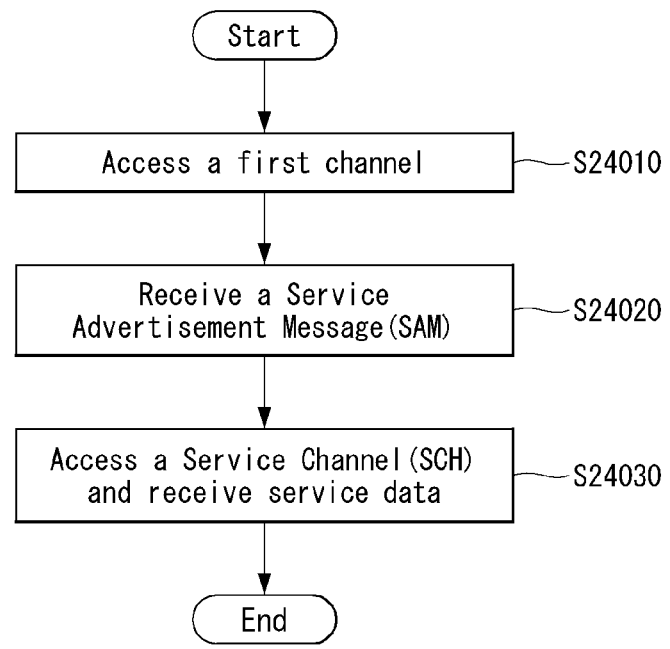

V2X COMMUNICATION DEVICE AND COMMUNICATION METHOD THEREOF

This application is the National Stage filing under 35 U.S.C. 371 of International Application No. PCT/KR2017/014754, filed on Dec. 14, 2017, the contents of which is hereby incorporated by reference herein in its entirety.

TECHNICAL FIELD

The present disclosure relates to a V2X communication device and a communication method thereof and, more particularly, to a communication method of a hybrid V2X communication device performing communication based on a WLAN V2X communication protocol and a cellular V2X communication protocol.

BACKGROUND ART

Vehicles are now being transformed from a product largely dependent on mechanical engineering to a product based on fusion of industrial technologies such as electrical, electronic, and communication technologies. In this regard, a vehicle is also called a smart car. A smart car connects the driver, the vehicle, and the transport infrastructure to provide not only conventional vehicle technology-based services such as traffic safety or congestion reduction but also various user-customized mobile services. This kind of connectivity may be implemented by using Vehicle-to-Everything (V2X) communication technology.

DISCLOSURE

Technical Problem

Various services may be provided through V2X communication. Also, to provide various services, a plurality of frequency bands has been used. In this environment, reliable communication and delivery of a safety service is very important considering the nature of vehicle communication. In particular, service advertisement messages for providing V2X services based on different communication protocols are needed.

Technical Solution

To solve the technical problem above, a hybrid V2X communication device performing communication based on a Wireless Local Area Network (WLAN) V2X communication protocol or a cellular V2X communication protocol; and a communication method of the hybrid V2X communication device are proposed.

A communication method of a hybrid V2X communication device according to an embodiment of the present disclosure comprises accessing a first channel; receiving a Service Advertisement Message (SAM) from the first channel, the SAM providing service information and information related with a service channel through which a service is provided; and accessing a service channel and receiving service data based on the SAM, wherein the SAM includes a header part and a body part, the header part including at least one of SAM ID information, SAM Count information, and SAM Extensions information; and the body part including service information and channel information.

In a communication method of a hybrid V2X communication device according to an embodiment of the present disclosure, the SAM is related to a basic service advertisement message supporting one of a WLAN V2X service or a cellular V2X service; or a hybrid service advertisement message supporting both the WLAN V2X service and the cellular V2X service.

In a communication method of a hybrid V2X communication device according to an embodiment of the present disclosure, based on the SAM being a basic service advertisement message, the basic service advertisement message includes service information on the WLAN V2X service and channel information on the WLAN V2X service or includes service information on the cellular V2X service and channel information on the cellular V2X service.

In a communication method of a hybrid V2X communication device according to an embodiment of the present disclosure, based on the SAM being a hybrid service advertisement message, the hybrid service advertisement message includes service information on the WLAN V2X service and channel information on the WLAN V2X service; and includes service information on the cellular V2X service and channel information on the cellular V2X service.

In a communication method of a hybrid V2X communication device according to an embodiment of the present disclosure, the SAM extensions information includes at least one of Transceiver Number Used information, Hybrid Mode information, and Hybrid SAM Type information, wherein the Transceiver Number Used information indicates the number of available transceivers included in the V2X device, the Hybrid Mode information indicates whether a hybrid mode supporting both the WLAN V2X service and the cellular V2X service is applied, and the Hybrid SAM Type information indicates whether the basic SAM or the hybrid SAM is supported.

In a communication method of a hybrid V2X communication device according to an embodiment of the present disclosure, the WLAN V2X communication protocol is implemented based on the Institute of Electrical and Electronics Engineers (IEEE) 802.11 standard, and the cellular V2X communication protocol is implemented based on the Evolved Universal Terrestrial Access (E-UTRA) standard of the 3rd Generation Partnership Project (3GPP) or the 5G New Radio (NR) standard.

Also, a hybrid V2X communication device according to an embodiment of the present disclosure comprises a memory storing data; a communication unit transmitting and receiving a radio signal, the RF unit including at least one of a first transceiver performing communication based on a Wireless Local Area Network (WLAN) V2X communication protocol or a second transceiver performing communication based on a cellular V2X communication protocol; and a processor controlling the communication unit, wherein the hybrid V2X communication device is configured to access a first channel, receive a Service Advertisement Message (SAM) from the first channel, and access a service channel and receive service data based on the SAM, wherein the SAM provides service information and information related with a service channel through which a service is provided, and the SAM includes a header part and a body part, the header part including at least one of SAM ID information, SAM Count information, and SAM Extensions information; and the body part including service information and channel information.

Advantageous Effects

According to the present disclosure, even a vehicle equipped with a transceiver for WLAN communication or a transceiver for cellular communication may figure out the whole hybrid V2X system and services. A service advertisement message according to the present disclosure may be used for providing a hybrid V2X service including a WLAN V2X service and a cellular V2X service. However, to ensure compatibility and prevent system overload, a basic service advertisement message that describes a single service and a hybrid service advertisement message that describes a hybrid service may be used together. Therefore, a vehicle may use a suitable service advertisement message according to a transceiver installed in the vehicle. By using a service advertisement message according to the present disclosure, resource utilization efficiency for providing services is improved, and a hybrid service may be provided to heterogeneous systems.

DESCRIPTION OF DRAWINGS

The accompanying drawings, which are included herein as a part of the description to help understanding the present disclosure, provide embodiments of the present disclosure and describe the technical features of the present disclosure with the description below.

FIG. 1 illustrates reference architecture of an Intelligent Transport System (ITS) station according to an embodiment of the present disclosure.

FIG. 2 illustrates an ITS access layer according to an embodiment of the present disclosure.

FIG. 3 illustrates multi-channel allocation used for an ITS system operation according to an embodiment of the present disclosure.

FIG. 4 illustrates a channel coordination mode of multi-channel operation according to an embodiment of the present disclosure.

FIG. 5 illustrates a structure of an LM NPDU according to an embodiment of the present disclosure.

FIG. 6 illustrates a structure of an SAM according to an embodiment of the present disclosure.

FIG. 7 illustrates a structure of an SAM Extensions field according to an embodiment of the present disclosure.

FIG. 8 illustrates Extensions elements and element IDs according to an embodiment of the present disclosure.

FIG. 9 illustrates a structure of a Service Info Segment of an SAM according to an embodiment of the present disclosure.

FIG. 10 illustrates Extensions elements used in a Service Info Segment according to an embodiment of the present disclosure.

FIG. 11 illustrates a structure of a Channel Info Segment of an SAM according to an embodiment of the present disclosure.

FIG. 12 illustrates a structure of IPv6 Routing Advertisement information of an SAM according to an embodiment of the present disclosure.

FIG. 13 illustrates a V2X communication system according to an embodiment of the present disclosure.

FIG. 14 illustrates a V2X communication system according to another embodiment of the present disclosure.

FIG. 15 illustrates a structure of an SAM according to an embodiment of the present disclosure.

FIG. 16 illustrates a V2X communication system according to another embodiment of the present disclosure.

FIG. 17 illustrates a structure of an SAM according to another embodiment of the present disclosure.

FIG. 18 illustrates signaling fields of a Service Info Segment according to an embodiment of the present disclosure.

FIG. 19 illustrates signaling fields of a Channel Info Segment according to an embodiment of the present disclosure.

FIG. 20 illustrates a method for determining an SAM packet structure according to an embodiment of the present disclosure.

FIG. 21 illustrates a structure of an SAM packet supporting hybrid V2X communication according to an embodiment of the present disclosure.

FIG. 22 illustrates SAM Extensions elements of the SAM according to an embodiment of the present disclosure.

FIG. 23 illustrates a hybrid V2X communication device according to an embodiment of the present disclosure.

FIG. 24 is a flow diagram illustrating a communication method of a hybrid V2X communication device according to the embodiment of the present disclosure.

MODE FOR INVENTION

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+ IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G (LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(*b*), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

FIG. 4 illustrates a channel coordination mode of multi-channel operation according to an embodiment of the present disclosure.

FIG. 4 illustrates one of channel coordination modes of multi-channel operation: (a), (b) continuous mode, (c) altering mode, (d) extended mode, and (e) immediate mode. The channel coordination mode may indicate a method for accessing a CCH and an SCH by a V2X device.

A V2X device may access at least one channel. As an embodiment, a single-radio device may monitor a CCH and exchange data via an SCH. To this purpose, a channel interval has to be specified, where FIG. 4 illustrates the channel interval, namely, time slot allocation. Radio channel altering may be operated based on an interval synchronized in association with a common time base. A sync interval may include a plurality of time slots. And a plurality of time slots may correspond to a CCH interval and an SCH interval. In this case, a sync interval may include a CCH interval and an SCH interval. During the CCH interval, traffic may be exchanged via the CCH. A single-radio device participating in an application service may switch to the SCH during the SCH interval. Each of the CCH interval and the SCH interval may include a guard interval. Each interval may start as a guard interval.

As an embodiment, exchange of multi-channel operation information and safety-related service information may be performed via the CCH during the CCH interval. Also, negotiation for exchange of information between a service provider and a user may be performed via the CCH during the CCH interval. A hardware timing operation for channel altering of the V2X device may be initiated by a sync signal obtained from Coordinated Universal Time (UTC)-based estimation. Channel synchronization may be performed at 1 Pulse Per Second (PPS) intervals based on the UTC.

As an embodiment, FIG. 4 illustrates a channel coordination method of Multi-Channel Operation (MCO) described in the IEEE 1609.4, where two MAC layers perform time division on one physical layer to use a CCH and the respective channel modes in an alternate manner.

(a) & (b) Continuous mode: In the continuous mode, each vehicle or all the vehicles operate independently of a time division reference such as the time slot/CCH interval/SCH interval of FIG. 4. In the continuous mode, a V2X device may continuously receive operation information and safety-related service information of multi-channels from a specified CCH or SCH or may perform exchange of information between a service provider and a user.

(c) Altering mode: In the altering mode, each vehicle or all the vehicles may receive operation information and safety-related service/information of multi-channels or may perform a negotiation process for information exchange between a service provider and a user during the CCH interval. In the altering mode, each vehicle of all the vehicles perform service/information exchange between the service provider and the user during the SCH interval. In the altering mode, a V2X device may perform communication via the CCH and the SCH in an alternate manner during configured CCH and SCH intervals.

(d) Extended mode: In the extended mode, communication during the CCH interval and the SCH interval may be performed as in the altering mode. However, service/information exchange during the SCH interval may also be performed during the CCH interval. As an embodiment, a V2X device in the extended mode may transmit and receive control information during the CCH interval; when the V2X device enters the SCH interval, it may maintain the SCH interval until service/information exchange is terminated.

(e) Immediate mode: In the immediate mode, a V2X device may perform communication as in the altering mode and/or extended mode. However, if negotiation for information exchange is completed during the CCH interval, a V2X device in the immediate mode may initiate information exchange by immediately performing channel switching to a specified SCH instead of waiting for the CCH interval to be terminated. As shown in FIG. 4, the extended mode and the immediate mode may be used together.

In the channel coordination modes of FIG. 4, management information of multi-channels and information exchange and negotiation for service provision may be performed only via the CCH during the CCH interval. Reception of safety-related service and information or negotiation for information exchange between a service provider and a user may also be performed only via the CCH during the CCH interval.

A guard interval may be included between the CCH interval and the SCH interval. A guard interval may secure time needed for synchronization when a communication device performs frequency change or channel change. At the time of channel change, hardware timer operation may be initiated by a sync signal obtained from Coordinated Universal Time (UTC)-based estimation. Channel synchronization may be performed at 1 Pulse Per Second (PPS) intervals by using the UTC as a reference signal.

As an embodiment, a sync interval may include the CCH interval and the SCH interval. In other words, one sync interval may include two time slots, and each of the CCH interval and the SCH interval may correspond to time slot 0 and time slot 1. The start of the sync interval may coincide with the start of the common time reference second. During one second, an integer multiple of the sync interval may be included.

A V2X device may perform communication by using the Multichannel Operation (MCO) technique employing multi-antennas. As an embodiment, the ETSI MCO design specified in the ETSI TS 102 646-4-2 mainly considers the following objectives.

A Channel Access (CA) method that effectively uses channel resources in multi-channels by using multi-antennas should be provided.

A mechanism should be provided, which allows a V2X device to effectively listen to a Service Announcement Message (SAM) providing V2X service information and to switch to the corresponding announced service channel.

A mechanism should be provided, which minimizes the interference effect between adjacent channels occurred when the same vehicle performs V2X transmission and reception by using two or more multi-antennas and adjacent channels.

The Control Channel (CCH) is a reference channel to which traffic safety-related messages such as Cooperative Awareness Message (CAM), Decentralized Environmental Notification Message (DENM), Topology (TOPO), and MAP are transmitted. Other safety messages not fully transmitted to the CCH may be provided through the SCH. If a safety message of a new type is added, the additional safety message may be provided through the SCH.

The SAM announces a V2X service provided through the Service Channel (SCH), where the SAM may be provided through a well-known reference channel. For example, information on a V2X service provided in the ITS-G5A/B/D channel band may be provided through the SAM via a reference CCH. However, since provision of a V2X service through the CCH may affect provision of a safety message, the service may not be provided through the CCH. The information on a V2X service provided in each channel band may also be provided via an alternate reference SCH arbitrarily specified in the channel band through the SAM.

In what follows, structures and signaling fields of a Localized Message Network Protocol Data Unit (LM NPDU) and a Service Advertisement Message (SAM)/WAVE Service Advertisement (WSA) will be described.

Service advertisement may be used to announce an ITS service capable of accessing a peer station operating as an ITS station, a WAVE device, or a V2X communication device. The service advertisement may be performed based on the Fast Service Advertisement Protocol (FSAP, ISO24102-5, ISO 21217) or the WAVE Service Advertisement (WSA, IEEE 1609.0). Service advertisement functions from the perspectives of a service provider and a service user are given below.

A service advertisement manager may transmit an SAM and receive a Service Response Message (SRM) for service management. The service advertisement manager may receive the SAM and transmit the SRM for client management. A service provider may provide an ITS service. A service user may receive the ITS service.

An ITS service may be provided through an ITS application. An ITS application is identified by a globally defined, unique ITS application identifier (ITS-AID, ISO 17419) in the OSI transport (or ITS station transport). For example, the IEEE WAVE uses a unique Provider Service Identifier (PSID, IEEE 1609.3, IEEE 1609.12) as the ITS-AID for identifying an ITS application. In this case, ITS-AID and PSID may indicate the common identifier. Also, ITS port number (ITS-PN) is used to identify the source and the destination of a message in the OSI transport. For example, the acronym PORT_SAM is used to identify the service advertisement protocol for receiving an SAM, and a dynamically allocated acronym PORT_DYN_SAM is used to identify the service advertisement protocol for receiving a unicast SAM.

FIG. 5 illustrates a structure of an LM NPDU according to an embodiment of the present disclosure.

The LM NPDU is a network protocol header and is attached to the front of the SAM described below. In general, the LM NPDU may provide information on the features of the network layer and information on the features of the transport layer. FIG. 5 shows a basic structure of the LN NPDU, which may be expressed in the binary format according to the Unaligned Packet Encoding Rules (UPER) applied to the ASN.1 type SAM.

When the LM NPDU transmits the SAM, the LM NPDU may also be referred to as a service advertisement message.

In FIG. 5, the LM consists of three parts: N-header, T-header, and body. In the following, the respective fields of the three parts are described.

Subtype: A 4-bit unsigned integer number indicating a networking related feature. This field may express 16 subtypes that indicate the networking-related features. For example, the Subtype field may indicate a subtype such as Null-Networking, ITS station-internal forwarding, N-hop forwarding, and Geo-forwarding.

N-Extensions flag: A 1-bit unsigned integer number indicating existence of the N-Extension signaling field in the N-header. As an embodiment, if the bit value is 1, it may indicate existence of the N-Extensions flag, otherwise it may indicate absence of the N-Extensions flag.

Version: A 3-bit unsigned integer number indicating the LM protocol version. The initial protocol version number may be set to 3.

Depends on Subtype: Depending on the Subtype (depending on the networking feature), the Depends on Subtype field may or may not be used.

N-Extensions: This variable has an Element ID and represents information on the Extensions element used in the N-header. As an embodiment, the Extensions element may include at least one of Transmit Power Used, Channel Number, Data Rate, LM TX CIP, LM RX CIP, and Channel Busy Ratio. Descriptions of the elements are given below.

Transmit Power Used: Transmit power used, which may be used by an LM receiver and may be inserted to the LM-N header selectively.

Channel Number: A channel number used, which may be used by an LM receiver and may be inserted to the LM-N header selectively.

Data rate: Data rate applied, which may be used by an LM receiver and may be inserted to the LM-N header selectively.

LM TX CIP: A Communication Interface Parameter (CIP) set to the transmitter, which may be inserted to the LM-N header selectively.

LM RX CIP: It may be used in the Subtype and may be inserted selectively to the LM N-header as the CIP set by the ITS-SCU which has received the LM from a peer station.

Channel Busy Ratio: A 1-octet unsigned integer number indicating an observed CBR value in the range of 0% to 100% with a step of 0.5% in percentage units, where a number ranging from 201 to 255 may represent an unknown ratio.

Feature selector: A signaling field for selecting a feature of the Transport Protocol Identifier (TPID) related to transport. This field may be expressed by a 7-bit unsigned integer number.

T-Extensions flag: A signaling field for indicating existence of the T-Extension signaling field in the T-header. This field may be expressed by a 1-bit unsigned integer number. If the bit value is 1, it may indicate existence of the T-Extensions field, otherwise it may indicate absence of the T-Extensions field.

Depends on TPID: Depending on the feature selector or the transport-related feature, the Depends on subtype field may or may not be used.

T-Extensions: T-Extensions may have an Element ID, and the Extensions element used in the T-header may include a Packet ID.

Length of User Data: A signaling field representing octets of data contained therein, which has a length of 1 octet (0-127 (0xEF)) or 2 octets (128 (0x8080)-16383 (0xBFFF)).

User Data: This field represents data such as the SAM contained in a data unit.

FIG. 6 illustrates a structure of an SAM according to an embodiment of the present disclosure.

An SAM advertises service information provided by an ITS application or an ITS application class. An SRM may be used for receiving a service requiring to use a specifically allocated communication channel. FIG. 6 shows a basic structure of the SAM, which may be expressed in the binary format according to the UPER applied to the ASN.1 type SAM.

In FIG. 6, the SAM consists of a header and a body. In the following, the respective signaling fields of the header and the body are described.

Version: A 4-bit unsigned integer number indicating the service advertisement protocol version. The initial protocol version number may be set to 3.

Option selector: The Option selector field indicates existence of an optional signaling field in the SAM format. This field may be expressed by a 4-bit unsigned integer number, the respective bits of which may indicate existence of the SAM Extensions field, existence of the Service Info Segment field, existence of the Channel Info Segment field, and IPv6 Routing Advertisement field.

SAM-ID: A signaling field indicating the number of different advertisements allowed for the same station (or the same service advertisement provider). This field may be expressed by a 4-bit unsigned integer number and may indicate up to 16 different service advertisements.

SM Count: A signaling field for detecting change of the content of service advertisement having the SAM-ID field by using the ASN.1 type cyclic counter. This field may be expressed by a 4-bit unsigned integer number. Each SAM-ID may be assigned a different SAM counter. At the first transmission of a new SAM, the SAM counter may be set as 'SAM counter=0'. When there is a content change in the service advertisement of the SAM, the SAM counter is incremented by 1, and when the SAM counter reaches 15, it may be again set as 'SAM Counter=0'. The content of the SAM may be changed when a service already advertised is changed, a new service is added, or a service is provided intermittently.

SAM Extensions: The existence of the SAM Extensions field, which is an optional variable, may be determined by the value of bit 3 of the Option selector field.

Service Info Segment: The existence of the Service Info Segment field, which is an optional variable, may be determined by the value of bit 2 of the Option selector field.

Channel Info Segment: The existence of the Channel Info Segment field, which is an optional variable, may be determined by the value of bit 1 of the Option selector field.

IPv6 Routing Advertisement: The existence of the IPv6 Routing Advertisement, which is an optional variable, may be determined by the value of bit 0 of the Option selector field.

FIG. 7 illustrates a structure of an SAM Extensions field according to an embodiment of the present disclosure.

The SAM Extensions field of FIG. 6 may be composed of the following elements as shown in FIG. 7. An Extensions element is used to provide additional information related with a message, and Extensions elements to be newly defined in a future are required to maintain backward compatibility. FIG. 7 illustrates a basic structure of Extensions elements, and the respective elements provide Element ID, Length, and Extension Data. The respective signaling fields are described below.

Count N: The Count N field has a variable length and indicates the number of contiguous Extensions elements.

Element ID: A 1-octet unsigned integer number that may be used to identify the type of the Extension Data field. A receiver may ignore an unidentified Element ID and may move on to the next Element ID for identification. To move to the next Element ID, the Length field may be used.

Length: The Length field indicates the number of octets contained in the Extension Data field. The size of 1 octet ranges from 0 (0x00) to 127 (0xEF), where the Most Significant Bit (MSB) is always set to '0', and the remaining 7 bits may be used to represent an unsigned integer number. The size of 2 octets ranges from 128 (0x8080) to 16383 (0xBFFF), where the MSB of the first octet may be always set to '1', and the second MSB of the first octet may be set to '0'. The remaining 14 bits may be used to represent an unsigned integer number.

Extension Data: This field contains information on the Extension Data with an Element ID. FIG. 8 illustrates Extensions elements and Element IDs according to an embodiment of the present disclosure.

FIG. 9 illustrates a structure of a Service Info Segment of an SAM according to an embodiment of the present disclosure.

FIG. 9 shows a structure of the Service Info Segment of FIG. 6. The ASN.1 type optional Service Info Segment provides information related to a service advertised through the SAM. The basic signaling fields may be structured as shown in FIG. 9. The signaling fields comprising the Service Info Segment are described below.

Count N: The Count N field has a variable length and indicates the number of pieces of information on a continuous service.

ITS-AID: The ITS-AID field has a variable length and indicates the ID of an advertised service.

Channel Index: The Channel Index field may be expressed by a 5-bit unsigned integer number. The Channel Index field may be used as a pointer indicating the n-th channel parameter set information of the Channel Info Segment. As a result, the Channel Index field may provide channel parameter information related to a provided service. For example, if the Channel Index=1, the Channel Index field may indicate the first channel parameter set. If the Channel Index=2, the Channel Index field may indicate the second channel parameter set. The Channel Index may provide a value ranging from 1 to 31. The Channel Index value of 0 may be used when a service channel is required to be changed or is not needed.

Option Selectors: The Option Selectors field may indicate existence of an optional signaling field as follows. If bit 2 is '1'b, it may indicate existence of a System Service field. If bit 1 is '1'b, it may indicate existence of the Replay Port Number field. If bit 0 is '1'b, it may indicate existence of the Service Info Extensions field.

System Service: This field is an optional signaling field, the existence of which may be checked from the bit 2 of the Option Selectors field. If the ITS-AID=0, it may indicate existence of the System Service field.

Reply Port Number: This field is an optional signaling field, the existence of which may be checked from the bit 1 of the Option Selectors field. The Replay Port Number is a destination port number of a message provided by a service provider and may be used by a service user.

Service Info Extensions: This field is an optional signaling field, the existence of which may be checked from the bit 0 of the Option Selectors field. Referring to FIG. 8, the Extensions elements used in the Service Info Extensions may be summarized as shown in FIG. 10.

FIG. 10 illustrates Extensions elements used in a Service Info Segment according to an embodiment of the present disclosure.

The respective elements shown in FIG. 10 are described below.

Provider Service Context: The Provider Service Context element may provide additional information related to an advertised application and may have a length amounting to 1 octet to 31 octets.

IPv6 Address: The IPv6 Address element is used when an application uses an IP address. This element may provide a 128-bit address of a device hosting an advertised application and follow the ITEF RFC 4291 format.

Service Port: The Service Port element is used when an application uses an IP address. This element may provide a 16-bit port number (for example, an UDP port number or a TCP port number) of a higher layer entity providing a service.

Provider MAC Address: The Provider MAC Address element provides a 48-bit MAC address of a device providing an application when a device providing the application and a device transmitting the SAM are different from each other.

Received Channel Power Indicator (RCPI) Threshold: This element indicates the recommended minimum strength (dBm) of a received SAM signal, where an SAM received with a strength less than 0 to 110 dBm may be ignored.

WSA Count Threshold: This element indicates the recommended minimum number of SAM/WSA receptions. The WSA Count Threshold element has a length of 1 octet and may be configured to range from 0 to 255. At this time, the SAM/WSA received less than the recommended number of times may be ignored.

WSA Count Threshold Interval: An optional element that may be used together with the SAM/WSA Count Threshold, and the received SAM/WSA Count indicates a valid time interval. In other words, if the SAM Count Threshold Interval is set, the SAM Count operates only within the allowed time period. At this time, the time interval has a length of 1 octet, and an unsigned integer number in the range of 1 to 255 (in units of 100 ms) is used to set the value of the time interval. The SAM Count Threshold Interval element is not used, the default value may be set to be 1 second.

SAM Application Data: This element contains application data and may allow the Fast Service Advertisement Protocol (FSAP) for transmission of a short message.

FIG. 11 illustrates a structure of a Channel Info Segment of an SAM according to an embodiment of the present disclosure.

FIG. 11 illustrates a structure of the Channel Info Segment of FIG. 6. The ASN.1 type optional Channel Info Segment provides information related to a service advertised through the SAM. The basic signaling fields may be structured as shown in FIG. 11. The signaling fields comprising the Channel Info Segment are described below.

Count N: The Count N field has a variable length and indicates the number of continuous channel information sets. Each channel information set may represent one channel feature related to 0 or more service Info sets.

Operating Class: The Operating Class field has a size of 1 octet and may perform the same function as the operating class of the IEEE 802.11. This field provides information related to the channel number field/information so that a specific channel may be identified uniquely within a nation or a region.

Channel Number: The Channel Number field has a size of 1 octet and may perform the same function as the operating class of the IEEE 802.11. The Channel Number field indicates the unique channel number of a channel providing a service. Each Channel Info set may have a pair of the Operating Class and the Channel Number fields different from other pairs.

Transmit Power Level: The Transmit Power Level field has a size of 1 octet. This field indicates a transmit power level required for a service providing channel to perform transmission, which may be expressed in terms of Effective Isotropic Radiated Power (EIRP). This field may be set to have a value in the range of −128 dBm to 127 dBm. The configured EIRP may represent the maximum power.

Adaptable: The Adaptable field indicates whether the value of the Data Rate field configured by 1 bit is a fixed value or a boundary value. For example, if the Adaptable field value is 1, the Data Rate value indicates the allowed minimum boundary value while, if the Adaptable field value is 0, the Data Rate value may indicate a fixed value.

Data Rate: The Data Rate field indicates a data rate allowed in a channel and may be expressed by a 7-bit unsigned integer value. The field value is configured to be in the range of 0x02 (1 Mb/s) to 0x7F (63.5 Mb/s) and is incremented in units of 500 kbit/s. If Adaptable='1', the Data Rate value means the allowed minimum boundary value while, if Adaptable='0', the Data Rate value means a fixed value.

Option Selector: The Option Selector field has a size of 1 octet and may indicate 8 option selection bits. As an embodiment, if bit 0 of the Option Selector field is '1', it may indicate existence of the Channel Info Extensions field while, if bit 0 of the Option Selector field is '0', it may indicate that the Channel Info Extensions field does not exist.

Channel Info Extensions: The Channel Info Extensions field is an optional signaling field, existence of which may be checked through bit 0. The Extensions element used in the Channel Info Extensions field may include at least one of the EDCA parameter set element or the channel access element. The EDCA parameter set element may provide MAC layer channel access parameter information to be used for communication among various devices in the corresponding channel. The channel access element may indicate a time slot through which a service provider may provide a service in the corresponding channel. As an embodiment, the channel access element value described in the WSA (IEEE 1609.3) is as follows. If the channel access element value is 0, it corresponds to continuous access and indicates both the time slot 1 and the time slot 2. If the channel access element value is 1, it corresponds to alternating access and indicates only the time slot 0 while, if the channel access element value is 2, it corresponding to alternating access but indicates only the time slot 1.

FIG. 12 illustrates a structure of IPv6 Routing Advertisement information of an SAM according to an embodiment of the present disclosure.

FIG. 12 illustrates the structure of the IPv6 Routing Advertisement field shown in FIG. 6. The ASN.1 type IPv6 Routing Advertisement information provides information necessary for connecting to the Internet infrastructure so that a receiving vehicle/terminal may connect to the IPv6 network providing services. The structure of the basic signaling field may be constructed as shown in FIG. 12. The signaling fields comprising the IPv6 Routing Advertisement information are described below.

Router Lifetime: The Router Lifetime field is a field described in the IETF RFC 4861 and defines the duration for which information related to the default gateway is valid. As a result, it is not possible to use information beyond the valid time duration.

IPv6 Prefix: The IPv6 Prefix field is a field described in the IETF RFC 4861 and provides the IPv6 subnet prefix of the corresponding link.

IPv6 Prefix Length: The IPv6 Prefix Length field is a filed described in the IETF RFC 4861 and provides information on the number of significant bits in the IPv6 Prefix field.

Default Gateway: The Default Gateway field provides a 128-bit IPv6 address of a router providing access to internetworks via a subnet.

Primary DNS: The Primary DNS field provides a 128-bit IPv6 address of a device capable of providing a Domain Name System (DNS) lookup for a subnet device.

IPv6 Routing Extensions: The Extensions element used in the IPv6 routing advertisement may include at least one element of the secondary DNS element or the gateway MAC address. The secondary DNS element provides a 128-bit IPv6 address of an alternative device capable of providing a DNS lookup for a subnet device. The gateway MAC address element is an element used when the MAC address and the gateway address of a device transmitting the SAM are different from each other and represents the 48-bit MAC address related to the default gateway.

As described above, a smart car connects the driver, the vehicle, and the transport infrastructure to provide not only conventional vehicle technology-based services such as traffic safety or congestion reduction but also various user-customized mobile services. This connectivity may be implemented by using various V2X communication techniques including the ITS-G5 of Europe, the WAVE of US, and the New Radio (NR). NR may mean cellular V2X communication technology such as the LTE-V2X and 5G-V2X. Also, NR may mean a cellular-based, novel vehicle-to-vehicle communication technology. To operate the V2X communication technology in an effective manner, various V2X services and hybrid V2X systems are being developed. The present disclosure proposes a structure and signaling of a service advertisement message for supporting hybrid V2X communication including the ITS-G5 and the cellular V2X based on the Service Advertisement Message (SAM) used in the legacy ITS-G2 or WAVE technology. The SAM is used to announce an available ITS service to V2X communication devices such as ITS stations or WAVE devices. The WSA may be performed according to the Fast Service Advertisement Protocol (FSAP, ISO 24102-5, ISO 21217) or WAVE Service Advertisement (WSA, IEEE 1609.0).

In the present disclosure, the ITS-G5 or the WAVE refers to the Wireless Local Area Network (WLAN) communication method implemented based on the IEEE 802.11, and the cellular V2X refers to the V2X communication method performing communication by using 2G, 3G, 4G, or 5G cellular network. As an embodiment, the cellular V2X communication may be implemented based on the Evolved Universal Terrestrial Access (E-UTRA) of the 3rd Generation Partnership Project (3GPP) or the 5G New Radio (NR). In what follows, the ITS-G5 may be used as a term representing the 802.11 based WLAN communication technology, and the New Radio (NR) may be used as a term representing the cellular communication technology.

FIG. 13 illustrates a V2X communication system according to an embodiment of the present disclosure.

In FIG. 13, a service provider/system may include two multi-transceivers. The two multi-transceivers include an ITS-G5 transceiver and an NR transceiver. The service provider may support a hybrid V2X service. The hybrid V2X service means a service that supports both the WLAN communication technology and the cellular communication technology.

The SAM transmitted through each transceiver may provide a V2X service and system configuration information provided through the ITS-G5 and the NR. The structure of one SAM may be different from that of the other.

A service recipient may include two multi-transceivers as the service provider. In other words, the service recipient may include the ITS-G5 transceiver and the NR transceiver.

In FIG. 13, since the ITS-G5 SAM and the SAM of NR required for hybrid V2X operation are provided to the ITS-G5 transceiver and the NR transceiver respectively, the overall message overhead is reduced. A vehicle equipped with both the ITS-G5 transceiver and the NR transceiver may receive hybrid V2X system operation and related services by using the SAM information received through the respective transceivers. However, if it is not possible to receive either of the SAMs received through the respective transceivers is not received or information of the corresponding SAM is lost, the service recipient may not be able to receive the hybrid system operation and related services even though the vehicle is equipped with two transceivers. In the case of a vehicle equipped with only the ITS-G5 transceiver or the NR transceiver, only the corresponding SAM information may be received. Therefore, the service recipient is able to receive only the corresponding system operation information and service.

FIG. 14 illustrates a V2X communication system according to another embodiment of the present disclosure.

In FIG. 14, a service provider/system may include one transceiver. In other words, the service provider may include an ITS-G5 transceiver or an NR transceiver. Since it is not possible to coordinate channel resources and services between the ITS-G5 and the NR, the service provider is unable to provide a hybrid V2X service.

The SAM transmitted through the ITS-G5 transceiver may provide the ITS-G5 related service and system configuration information, and the SAM transmitted through the NR transceiver may provide the NR-related service and system configuration information. The SAMs may be different from each other.

A service recipient may include an ITS-G5 transceiver or an NR transceiver as the service provider or may include both of the transceivers.

The SAM shown in FIG. 14 may be referred to as a basic SAM. The main features of the structure of the basic SAM are as follows.

A vehicle equipped with both the ITS-G5 transceiver and the NR transceiver may use the SAM information received through the respective transceivers. However, in the embodiment of FIG. 14, a service provider does not perform hybrid V2X system operation and hybrid V2X service provision. The information received via the SAM is the information on the ITS-G5 service or the NR service. A vehicle equipped with the ITS-G5 transceiver or the NR transceiver is able to receive only the corresponding SAM information and as a result, may receive operation information and service of only one system.

FIG. 15 illustrates a structure of an SAM according to an embodiment of the present disclosure.

FIG. 15 illustrates an SAM structure for providing services in the NR system. For illustration of FIG. 15, the same structure of the SAM as shown in FIGS. 6 to 12 will not be described again. The SAM may be expressed in the binary format based on the Unaligned Packet Encoding Rules (UPER) applied to the ASN.1 type SAM.

FIG. 6 illustrates the SAM used in the WLAN based V2X system such as the ITS-G5/WAVE system. In other words, in FIG. 6, the Service Info Segment and Channel Info Segment provide service information and channel information on the ITS-G5/WAVE system, respectively.

In FIG. 15, (a) the Service Info Segment provides NR service information, and (b) the Channel Info Segment provides NR channel information. As another embodiment, the SAM for a cellular-based V2X service may include a Service Info Segment providing cellular service information and a Channel Info Segment providing cellular channel information.

FIG. 16 illustrates a V2X communication system according to another embodiment of the present disclosure.

In FIG. 16, a service provider/system includes an ITS-G5 transceiver and an NR transceiver. The service provider supports a hybrid V2X service. Therefore, the SAMs transmitted through the respective transceivers provide all the V2X service information and system configuration information provided to the ITS-G5 and NR systems. As a result, the SAM transmitted through the ITS-G5 transceiver and the SAM transmitted through the NR transceiver may include the same information.

A service recipient may include the ITS-G5 transceiver and the NR transceiver as the service provider or may include the ITS-G5 transceiver or the NR transceiver.

As shown in FIG. 16, the SAM for providing a hybrid V2X service may be referred to as a hybrid SAM. A hybrid SAM may have the following features.

To provide a hybrid V2X service, system operation and service information for the ITS-G5 and NR systems are provided via one SAM. Therefore, compared with the basic SAM, message overhead may be increased.

A vehicle equipped with both the ITS-G5 transceiver and the NR transceiver may receive hybrid V2X system operation information and service information by using the SAM received via one of the two transceivers. In other words, even if it becomes impossible to receive either of the SAMs received through the respective transceivers or information of the corresponding SAM is lost, the service recipient may obtain the hybrid V2X system operation information and hybrid V2X service information through the other SAM.

A vehicle equipped with the ITS-G5 transceiver or the NR transceiver may receive only the corresponding service but may obtain operation and service information related to an adjacent hybrid V2X system. Therefore, even when a vehicle is equipped only with the ITS-G5 transceiver or the NR transceiver, channel resources may be operated so as to reduce interference on a hybrid V2X service by referring to the hybrid V2X system operation information.

FIG. 17 illustrates a structure of an SAM according to another embodiment of the present disclosure.

FIG. 17 illustrates a structure of the hybrid SAM. In order to provide hybrid V2X system operation and hybrid V2X service via the hybrid SAM, the Service Info Segment and the Channel Info Segment are newly defined. Different from the basic SAM, all the information related to the ITS-G5 system and the NR system may be included in one SAM. To facilitate parsing of signaling fields in the receiver, the ITS-G5 information and the NR information may be grouped separately but disposed in a consecutive manner. As shown in FIG. 17, the service information of a hybrid SAM includes the ITS-G5 service information and the NR service information. Also, channel information of the hybrid SAM includes the ITS-G5 channel information and the NR channel information.

FIG. 18 illustrates signaling fields of a Service Info Segment according to an embodiment of the present disclosure.

FIG. 18 illustrates the Service Info Segment included in the hybrid SAM of FIG. 17 in more detail. The Service Info Segment may include a WLAN Service Info Segment and a cellular Service Info Segment.

According to FIG. 18, the ASN.1 type optional Service Info Segment provides information related to services advertised through an SAM. For descriptions of individual signaling fields, it is advised to refer to the Service Info Segment described with reference to FIG. 9. However, in FIG. 18, the "Count N" field indicating the number of Service Info Segments may be defined as a sum of the number of ITS-G5 Service Info Segments and the number of NR Service Info Segments.

FIG. 19 illustrates signaling fields of a Channel Info Segment according to an embodiment of the present disclosure.

FIG. 19 illustrates the Channel Info Segment included in the hybrid SAM of FIG. 17 in more detail. The Channel Info Segment may include a WLAN Channel Info Segment and a cellular Channel Info Segment.

According to FIG. 19, the ASN.1 type optional Channel Info Segment provides parameter information related to a transmission channel used by a service advertised through an SAM. As an embodiment, the Channel Info Segment may provide transmission channel parameters such as the Operating Class, Channel Number, Transmit Power Level, and Data Rate. For descriptions of individual signaling fields, it is advised to refer to the descriptions of the Channel Info Segment given with reference to FIG. 11. However, in FIG. 19, the "Count N" field indicating the number of Channel Info Segments may be defined as a sum of the number of ITS-G5 Channel Info Segments and the number of NR Channel Info Segments.

FIG. 20 illustrates a method for determining an SAM packet structure according to an embodiment of the present disclosure.

A V2X device may determine whether to install an NR transceiver and an ITS-G5 transceiver S20010.

When the V2X device includes only the NR transceiver S20110, the V2X device may determine to use the basic SAM S20120 and may generate and transmit the basic SAM S20130.

When the V2X device includes only the ITS-G5 transceiver S20210, the V2X device may determine to use the basic SAM S20220 and may generate and transmit the basic SAM S20230.

When the V2X device includes the NR transceiver and the ITS-G5 transceiver S20310, the V2X device may analyze the condition and the environment for determining the SAM structure S20320. The V2X device may determine the structure of the SAM based on the analysis result S20330. If the V2X device determines to used the basic SAM S20340, the V2X device may generate and transmit the basic SAM S20350. If the V2X device determines to used the hybrid SAM S20360, the V2X device may generate and transmit the hybrid SAM S20370.

FIG. 21 illustrates a structure of an SAM packet supporting hybrid V2X communication according to an embodiment of the present disclosure.

The structure of the service advertisement message of FIG. 21 is similar to that of the service advertisement message shown in FIG. 6, and therefore, descriptions of the structure will not be repeated.

The SAM Extensions field within the signaling fields of the SAM header may be used to provide the information on the number of transceivers and the structure of an SAM supporting hybrid V2X services. The SAM Extensions field included in the header of the SAM may include Transceiver Number Used element indicating the number of transceivers, Hybrid Mode element, and Hybrid SAM Type element.

As an embodiment, the Transceiver Number Used may be 2-bit information and indicate the number of transceivers used by the V2X device. The 2-bit information may be defined as follows.

'00'b: one transceiver is used.
'01'b: two transceivers are used.
'10'b: three transceivers are used.
'11'b: four transceivers are used.

In this case, the number of antennas or the number of transceivers does not distinguish the NR transceiver and the ITS-G5 transceiver from each other.

The Hybrid Mode provides 1-bit information and indicate whether a hybrid V2X service is supported. The 1-bit information may be defined as follows.

'0'b: hybrid V2X services are not supported.
'1'b: hybrid V2X services are supported.

Even when both an NR transceiver and an ITS-G5 transceiver are installed, if the value of the Hybrid Mode element is '0'b, hybrid V2X services are not supported. Also, if only one transceiver/antenna of the NR transceiver or the ITS-G5 transceiver is installed, hybrid V2X services are not supported.

The Hybrid SAM Type provides 1-bit information and indicates the structure type of an SAM. The 1-bit information of the Hybrid SAM Type element may be defined as follows.

'0'b: basic SAM structure is supported.
'1'b: hybrid SAM structure is supported.

FIG. 22 illustrates SAM Extensions elements of the SAM according to an embodiment of the present disclosure.

FIG. 22 illustrates an embodiment of NR system operation and related services provided via a basic SAM and a hybrid SAM. Each element may be defined by the ASN.1 type similarly to how elements of the SAM specified based on the conventional ITS-G5 services are described and may have a unique element ID.

FIG. 23 illustrates a hybrid V2X communication device according to an embodiment of the present disclosure.

FIG. 23 illustrates a block diagram of a hybrid V2X communication device according to an embodiment of the present disclosure, and the hybrid V2X communication device according to the present disclosure may be referred to as a V2X communication device.

In FIG. 23, a V2X communication device 23000 may include a communication unit 23010, a processor 23020, and a memory 23030. As described above, the V2X communication device may correspond to an On Board Unit (OBU) or a Road Side Unit (RSU) or may be included in the OBU or in the RSU. The V2X communication device may be included in an ITS station or may correspond to the ITS station.

The communication unit 23010 may be connected to the processor 23020 and transmit/receive a radio signal. The communication unit 23010 may transmit a signal by up-converting data received from the processor 23020 to a transmission and reception band. The communication unit may implement the operation of the access layer. As an embodiment, the communication unit may implement the operation of the physical layer included in the access layer or may additionally implement the operation of the MAC layer. The communication unit may include a plurality of sub-communication units to perform communication according to a plurality of communication protocols.

The processor 23020, being connected to the communication unit 23030, may implement the operation of layers according to an ITS system or a WAVE system. The processor 23020 may be configured to perform operation according to various embodiments of the present disclosure with reference to the drawings and descriptions given above. Also, at least one of module, data, program, or software that implements the operation of the V2X communication device 23000 according to various embodiments of the present disclosure may be stored in the memory 23030 and executed by the processor 23020.

The memory 23030, being connected to the processor 23020, stores various pieces of information to operate the processor 23020. The memory 23030, being installed inside or outside of the processor 23020, may be connected to the processor 23020 via a well-known means. The memory may include a security/non-security storage device or may be included in the security/non-security storage device. Depending on embodiments, the memory may be referred to as a security/non-security storage device.

A specific structure of the V2X communication device 23000 of FIG. 23 may be implemented so that various embodiments of the present disclosure may be applied independently or two or more embodiments may be applied together.

In particular, according to an embodiment of the present disclosure, the communication unit may include at least two transceivers. The communication unit may include a transceiver performing communication according to a WLAN V2X communication protocol based on the Institute of Electrical and Electronics Engineers (IEEE) 802.11 and a transceiver performing communication according to a cellular V2X communication protocol based on the LTE/Evolved Universal Terrestrial Access (E-UTRA) or 5G New Radio (NR) of the 3rd Generation Partnership Project (3GPP). A transceiver that performs communication according to a WLAN V2X communication protocol in the ITS-G5 may be referred to as a WLAN transceiver. A transceiver that performs communication according to a cellular communication protocol as in the NR may be referred to as a cellular transceiver.

FIG. 24 is a flow diagram illustrating a communication method of a hybrid V2X communication device according to the embodiment of the present disclosure.

The V2X communication device accesses a first channel S24010. The first channel may be a control channel. As an embodiment, the first channel may be a service channel.

The V2X communication device may receive a service advertisement message S24020. The V2X communication device may receive a service advertisement message via the CCH or the SCH. The service advertisement message may provide service information and information related with a service channel through which a service is provided.

The V2X communication device may access a service channel and receive service data S24030.

As an embodiment, a service advertisement message may include a header part and a body part. The header part may include at least one of SAM ID information, SAM Count information, and SAM Extensions information. The body part may include service information and channel information.

The SAM may be related to a basic service advertisement message supporting one of a WLAN V2X service or a cellular V2X service; or a hybrid service advertisement message supporting both the WLAN V2X service and the cellular V2X service.

When the SAM is a basic service advertisement message, the basic service advertisement message may include service information on the WLAN V2X service and channel information on the WLAN V2X service. Also, the basic service advertisement message may include service information on the cellular V2X service and channel information on the cellular V2X service.

When the SAM is a hybrid service advertisement message, the hybrid service advertisement message may include service information on the WLAN V2X service and channel information on the WLAN V2X service; and may include service information on the cellular V2X service and channel information on the cellular V2X service.

The SAM extensions information includes at least one of Transceiver Number Used information, Hybrid Mode information, and Hybrid SAM Type information. The Transceiver Number Used information indicates the number of available transceivers included in the V2X device. The Hybrid Mode information indicates whether a hybrid mode supporting both the WLAN V2X service and the cellular V2X service is applied. The Hybrid SAM Type information indicates whether the basic SAM or the hybrid SAM is supported.

The WLAN V2X communication protocol may be implemented based on the Institute of Electrical and Electronics Engineers (IEEE) 802.11 standard, and the cellular V2X communication protocol may be implemented based on the Evolved Universal Terrestrial Access (E-UTRA) standard of the 3rd Generation Partnership Project (3GPP) or the 5G New Radio (NR) standard.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure or feature of another embodiment. It should be clearly understood that the claims which are not explicitly cited within the technical scope of the present disclosure may be combined to form an embodiment or may be included in a new claim by an amendment after application.

The embodiments of the present disclosure may be implemented by various means such as hardware, firmware, software, or a combination thereof. In the case of hardware implementation, one embodiment of the present disclosure may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

Mode for Invention

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The present disclosure describes both of the apparatus disclosure and the method disclosure, and descriptions of the respective disclosures may be applied in a supplementary manner.

Various embodiments have been described in their best mode for implementing the present disclosure.

INDUSTRIAL APPLICABILITY

The present disclosure is used in a series of vehicle communication applications.

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The invention claimed is:

1. A communication method of a hybrid V2X communication device configured to perform communication based on a Wireless Local Area Network (WLAN) V2X communication protocol or a cellular V2X communication protocol, the method comprising:
 accessing a first channel;
 receiving a Service Advertisement Message (SAM) from the first channel, the SAM providing service information and information related to a service channel through which a service is provided; and
 accessing the service channel and receiving service data based on the SAM,
 wherein the SAM includes a header part and a body part,
 wherein the header part includes SAM ID information, SAM Count information, and SAM Extensions information,
 wherein the body part includes service information and channel information,
 wherein the SAM is one of (i) a basic service advertisement message supporting one of a WLAN V2X service and a cellular V2X service and (ii) a hybrid service advertisement message supporting both the WLAN V2X service and the cellular V2X service, and
 wherein the SAM Extensions information of the SAM includes Hybrid SAM Type information representing whether the basic SAM or the hybrid SAM is supported.

2. The method of claim 1, wherein, based on the SAM being a basic service advertisement message, the basic service advertisement message includes service information on the WLAN V2X service and channel information on the WLAN V2X service or includes service information on the cellular V2X service and channel information on the cellular V2X service.

3. The method of claim 1, wherein, based on the SAM being a hybrid service advertisement message, the hybrid service advertisement message includes service information on the WLAN V2X service and channel information on the WLAN V2X service, and includes service information on the cellular V2X service and channel information on the cellular V2X service.

4. The method of claim 1, wherein the SAM Extensions information further includes at least one of Transceiver Number Used information and Hybrid Mode information, and
 wherein the Transceiver Number Used information indicates the number of available transceivers included in the V2X device and the Hybrid Mode information indicates whether a hybrid mode supporting both the WLAN V2X service and the cellular V2X service is applied.

5. The method of claim 4, wherein the WLAN V2X communication protocol is implemented based on the Institute of Electrical and Electronics Engineers (IEEE) 802.11 standard, and the cellular V2X communication protocol is implemented based on the Evolved Universal Terrestrial Access (E-UTRA) standard of the 3rd Generation Partnership Project (3GPP) or the 5G New Radio (NR) standard.

6. A hybrid V2X communication device, the device comprising:
 a memory storing data;
 at least one of a first transceiver performing communication based on a Wireless Local Area Network (WLAN) V2X communication protocol or a second transceiver performing communication based on a cellular V2X communication protocol; and
 a processor controlling the at least one first transceiver and the second transceiver,
 wherein the hybrid V2X communication device is configured to:
 access a first channel;
 receive a Service Advertisement Message (SAM) from the first channel, the SAM providing service information and information related to a service channel through which a service is provided; and
 access the service channel and receive service data based on the SAM,
 wherein the SAM includes a header part and a body part,
 wherein the header part includes SAM ID information, SAM Count information, and SAM Extensions information,
 wherein the body part includes service information and channel information,
 wherein the SAM is one of (i) a basic service advertisement message supporting one of a WLAN V2X service and a cellular V2X service and (ii) a hybrid service advertisement message supporting both the WLAN V2X service and the cellular V2X service, and
 wherein the SAM Extensions information of the SAM includes Hybrid SAM Type information representing whether the basic SAM or the hybrid SAM is supported.

7. The device of claim 6, wherein, based on the SAM being a basic service advertisement message, the basic service advertisement message includes service information on the WLAN V2X service and channel information on the WLAN V2X service or includes service information on the cellular V2X service and channel information on the cellular V2X service.

8. The device of claim 6, wherein, based on the SAM being a hybrid service advertisement message, the hybrid service advertisement message includes service information on the WLAN V2X service and channel information on the WLAN V2X service; and service information on the cellular V2X service and channel information on the cellular V2X service.

9. The device of claim 6, wherein the SAM Extensions information further includes at least one of Transceiver Number Used information and Hybrid Mode information, and
 wherein the Transceiver Number Used information indicates the number of available transceivers included in the V2X device and the Hybrid Mode information indicates whether a hybrid mode supporting both the WLAN V2X service and the cellular V2X service is applied.

10. The device of claim 6, wherein the WLAN V2X communication protocol is implemented based on the Institute of Electrical and Electronics Engineers (IEEE) 802.11 standard, and the cellular V2X communication protocol is implemented based on the Evolved Universal Terrestrial Access (E-UTRA) standard of the 3rd Generation Partnership Project (3GPP) or the 5G New Radio (NR) standard.

* * * * *